(12) United States Patent
Lazich et al.

(10) Patent No.: US 7,797,361 B2
(45) Date of Patent: Sep. 14, 2010

(54) SYSTEM AND METHOD FOR GENERATING RANDOM NUMBERS USING PARITY FEEDBACK

(75) Inventors: Dejan Lazich, Stutensee (DE); Herbert Alrutz, Freiburg (DE); Miodrag Temerinac, Gundelfingen (DE); Steffen Schober, Ballendorf (DE)

(73) Assignee: Micronas GmbH, Freiburg (DE)

( * ) Notice: Subject to any disclaimer, the term of this patent is extended or adjusted under 35 U.S.C. 154(b) by 1290 days.

(21) Appl. No.: 11/238,158

(22) Filed: Sep. 28, 2005

(65) Prior Publication Data
US 2006/0069706 A1 Mar. 30, 2006

(30) Foreign Application Priority Data
Sep. 28, 2004 (DE) .................. 10 2004 047 425

(51) Int. Cl.
*G06F 7/58* (2006.01)
*H03B 29/00* (2006.01)
(52) U.S. Cl. ............. 708/251; 708/250; 708/252
(58) Field of Classification Search ........... 708/250, 708/251
See application file for complete search history.

(56) References Cited

U.S. PATENT DOCUMENTS

| 4,415,818 | A | * | 11/1983 | Ogawa et al. ............... 326/40 |
| 4,694,412 | A | * | 9/1987 | Domenik et al. ............ 708/251 |
| 4,799,259 | A | * | 1/1989 | Ogrodski ..................... 380/46 |
| 4,855,690 | A |   | 8/1989 | Dias ............................ 331/78 |
| 4,905,176 | A | * | 2/1990 | Schulz ......................... 708/252 |
| 5,706,218 | A |   | 1/1998 | Hoffman ...................... 364/717 |
| 5,961,577 | A |   | 10/1999 | Soenen et al. ............... 708/251 |
| 5,963,104 | A | * | 10/1999 | Buer ............................ 331/78 |

(Continued)

FOREIGN PATENT DOCUMENTS

DE 199 26 640 12/2000 ............. 7/58

(Continued)

OTHER PUBLICATIONS

Killmann et al. "Funktionalitatsklassen und Evaluationsmethodologie fur physikalische Zufallszahlengeneratoren". Bundesamt für Sicherheit in der Informationstechnik, 2001.

(Continued)

*Primary Examiner*—Lewis A Bullock, Jr.
*Assistant Examiner*—Hang Pan
(74) *Attorney, Agent, or Firm*—Muncy, Geissler, Olds & Lowe, PLLC

(57) ABSTRACT

A method for generating random numbers in which oscillating digital output signals of unequal or equal periodicity are generated by at least two ring oscillators, an external parity signal representing a logical state being generated when an odd number of the output signals take on a specified logical state, the external parity signal being fed back to an external parity input of each of the respective ring oscillators. Also, a random number generator having at least two ring oscillators made up of independently freewnning inverter chains with feedback having an odd number of series-connected inverters that generate oscillating digital output signals of unequal or equal periodicity, and having first panty signal generating mechanisms that generate an external parity signal representing a logical state when an odd number of the output signals take on a specified logical state.

35 Claims, 30 Drawing Sheets

U.S. PATENT DOCUMENTS

| | | | |
|---|---|---|---|
| 6,065,029 A * | 5/2000 | Weiss | 708/251 |
| 6,240,432 B1 * | 5/2001 | Chuang et al. | 708/252 |
| 6,522,210 B1 * | 2/2003 | Dvorak et al. | 331/78 |
| 6,807,553 B2 * | 10/2004 | Oerlemans | 708/252 |
| 7,356,551 B2 * | 4/2008 | Hars | 708/250 |
| 7,376,687 B2 * | 5/2008 | Shimasaki | 708/251 |
| 2002/0186086 A1 | 12/2002 | Curiger et al. | 331/78 |
| 2003/0037079 A1 * | 2/2003 | Wilber | 708/250 |
| 2003/0185392 A1 | 10/2003 | Sun | 380/46 |
| 2003/0208517 A1 | 11/2003 | Takagi | 708/251 |
| 2004/0010526 A1 | 1/2004 | Dichti | 708/251 |

FOREIGN PATENT DOCUMENTS

| | | | | |
|---|---|---|---|---|
| WO | WO 02/082256 | 10/2002 | | 7/58 |
| WO | WO 03/081417 | 10/2003 | | |

OTHER PUBLICATIONS

Tkacik, Thomas E. "A Hardware Random Number Generator". Cryptographic Hardware and Embedded Systems—CHES 2002, 4th International Workshop, 2003, Revised Papers, pp. 450-453.

Marsaglia, G., "Diehard: A Battery of Tests for Randomness," http://stat.fsu.edu/pub/diehard/.

Rukhin et al. "Statistical Test Suite for the Validation of Cryptography Random Numbers Generators," National Institute of Standards and Technology, Gaithersburg, MD, 2000.

Rukhin et al. "Statistical Test Suite for Random and Pseudorandom Number Generators for Cryptographic Applications," National Institute of Standards and Technology, Gaithersburg, MD, 2001.

Schindler et al. "Evaluation Criteria for True (Physical) Random Numbers Generators Used in Cryptographic Applications", Cryptographic Hardware and Embedded Systems—CHES 2002, 4th International Workshop, 2003, Revised Papers, pp. 431-449.

Kolmogorov, Andrei. "Logical Basis for Information Theory and Probability Theory". IEEE Transactions on Information Theory, vol. IT-14, No. 5, Sep. 1968.

Cryptography Research, Inc., "Evaluation of the VIA C3 Nehemiah Random Number Generator," URL http://www.cryptography.com/resources/whitepapers/VIA_rng.pdf.

Jun et al.: "The Intel Random Number Generator", Cryptography Research, Inc. White Paper Prepared for Intel Corporation, Apr. 22, 1999.

"Evaluation of VIA C3 Nehemiah Random Number Generator", Cryptography Research, Inc. White Paper Prepared for VIA Technologies, Inc., Feb. 23, 2003.

Fischer et al.: "True Random Number Generator Embedded in Reconfigurable Hardware", Lecture Notes in Computer Science, vol. 2523, pp. 415-430.

Kolmogorov, Andrei N., "*Three Approaches to the Quantitative Definition of Information*," in Problems in Information Transmission, vol. 1, No. 1, pp. 3-11, 1965.

Li, Ming, and Paul Vitannyi, "*An Introduction to Kolmogorov Complexity and Its Applications*," Springer-Verlag (1993).

* cited by examiner

"1"/"0"(start/stop)

K= Odd Number

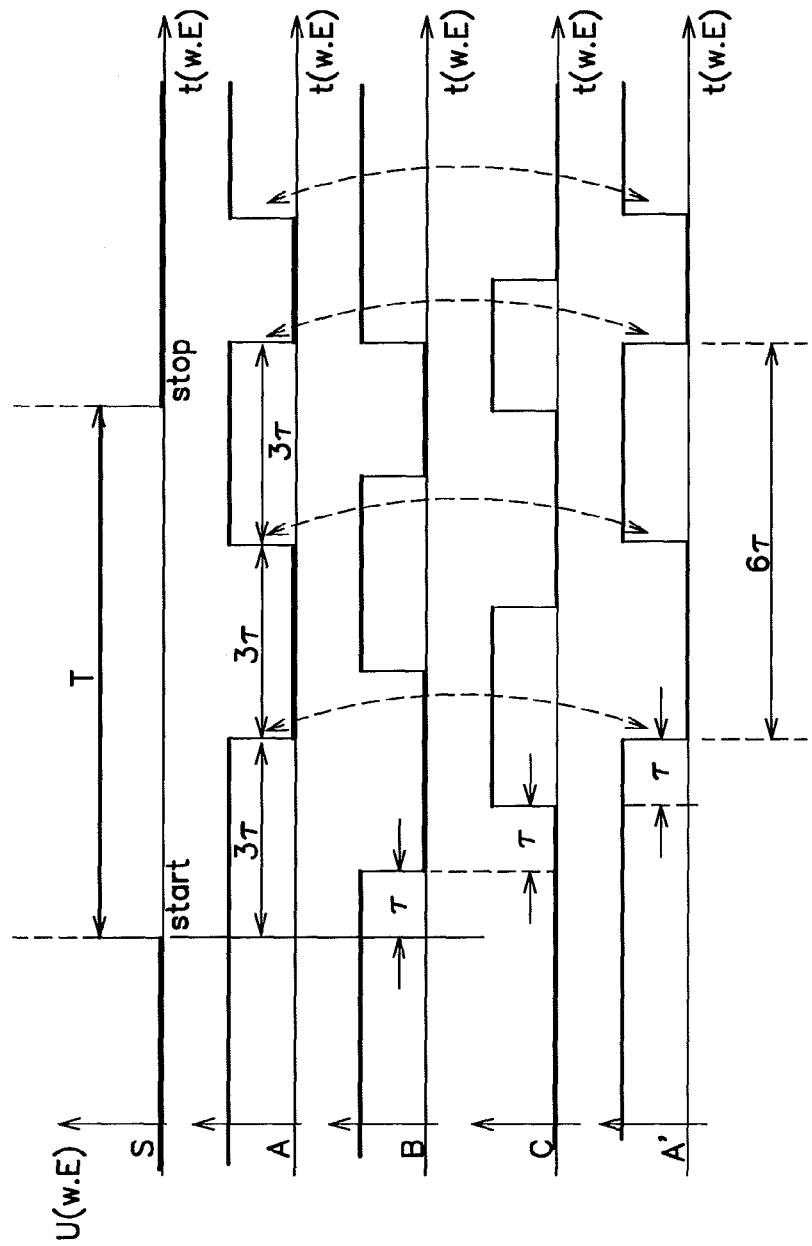

SYSTEM AND METHOD FOR GENERATING RANDOM NUMBERS USING PARITY FEEDBACK

PRIORITY INFORMATION

This patent application claims priority from German patent application 10 2004 047 425.7 filed Sep. 28, 2004, which is hereby incorporated by reference.

BACKGROUND OF THE INVENTION

The invention relates to a random number generator.

Random number generators (RNGs) are used for automatically generating random binary or multivalued numbers (random numbers). Random number generators are needed in many application fields, including for example: (i) cryptographic applications; (ii) stochastic simulations; (iii) testing of software and hardware; and (iv) computer games.

In what follows by way of example, cryptographic applications of random number generators will be considered. However, it is contemplated the system of the present invention of course is applicable to fields beyond cryptographic. Cryptographic applications include, for example;
For authentication:
  Challenge-response protocols
  Zero-knowledge proofs
For key sharing protocols:
  Diffie-Hellman methods
For key generation:
  Session keys for symmetrical encryption methods
  Key generation for asymmetric encryption methods (public-key methods)
  Generation of binary noise (one-time pad, McEleice public-key method)
  Parameter generation for public-key methods (e.g., generating random prime numbers)
For other cryptographic applications:
  Password generation
  Initial values (seeds) for deterministic random number generators (pseudorandom number generators)
  Padding of cleartext blocks
  Secure erasure of storage media (by multiple overwriting with random bit patterns).

In general there are two main kinds of generators, deterministic (i.e., pseudorandom number generators or PRNGs) and physical random number generators (i.e., true random number generators or TRNGs). Deterministic generators are algorithmic procedures that derive, from a randomly chosen initial value (IV), a much longer string of numbers that appears random. Naturally, this string per se cannot be truly random because of the deterministic character of the generating method.

In order that actually random strings of numbers can be generated, it is therefore necessary to employ a so-called physical random number generator. This uses either nondeterministic or chaotic physical processes to generate random numbers. The random numbers are generated by measuring and processing certain process measurements (e.g., thermal noise voltage across a resistance).

In what follows, it will be assumed that a cryptographic random number generator is implemented as a bit source. The individual bits are combined into blocks depending on the application (e.g., 56-bits for a key of the Data Encryption Standard or DES). It should be assumed in general that the bit strings generated by a cryptographic random number generator (e.g., a key) must remain secret in order not to compromise the security of the cryptosystem (in the list of applications in the preceding section, this does not hold for all the methods, up to challenge-response protocols and zero-knowledge proofs). In these cases, the random number generator generates the secret of the cryptographic method in question. With the aid of this secret, for example, cleartexts are encrypted. If the secret is unknown to the attacker, he always has to try out the choice of all possible bit strings (complete search). In the above example this would mean that the attacker, who has observed a cleartext encrypted with the unknown key, must try out a (statistical) average of $2^{55}$ possible keys before he can expect to have found the key actually generated. This attack is the worst possible case from the viewpoint of the attacker. In order to attack a system with success, the attacker must be capable of predicting a certain number of bits that a generator generates at a certain point in time. This can happen without any knowledge of other bit strings generated by the generator or with a knowledge of bit strings that the generator has generated before or after the unknown bit string. The attacker can attempt to guess the generated bit string either in full or only in parts. In the latter case, he can find the remaining bits by a complete search.

In order to make such a prediction, the attacker has access to all known technical and scientific tools. He is limited only with respect to the costs to be incurred for the attack. It can be assumed that these have to fall below a defined cost limit (an economic argument: the expected gain by the attack should not exceed the costs of the attack).

The bit source can be subdivided into various security levels depending on the level of the cost limit. If a bit source resists all attacks for a given cost limit, then it should be regarded as a practically secure bit source in relation to this cost limit.

FIG. 14 depicts a model of a physical random number generator 1400 in the form of a physical bit source. A substantial component of the source is a dynamic, unpredictable physical system, so-called random source 1401. An internal (time-dependent) state can be associated with this random source 1401. At temporal intervals, the value of the state of random source 1401 is measured and processed (value acquisition 1402) and one or a plurality of random bits are generated herefrom (random bit generation 1403). Strings of random bits generated in this way are designated as internal random bits. These can next be subjected to algorithmic post-processing 1404. The mathematical post-processing 1404 is in general performed in order to improve the quality of the internal random numbers (a measure for the quality of random numbers must still be defined here-see the next section for more detail). In general, one speaks of random extraction 1405. This means the elimination of dependences between successively generated bits and the elimination of bias that is often present (unequal distribution of zeroes and ones). The random bits generated in this manner are output in a further step and, as appropriate, stored in an output memory (random bit output 1405).

As illustrated in FIG. 14, the physical random number generator 1400 is not an isolated system but is embedded in a physical environment 1406. It should be assumed that the measured state and thus also the random bits generated are dependent on certain physical quantities of the environment 1406. These include quantities such as for example the power supply voltage delivered to the device, the ambient temperature, or electromagnetic fields. Various kinds of generators can be distinguished on the basis of the nature of the physical system. Two essential kinds of physical systems are used: (i) quantum systems; and (ii) classical systems.

A quantum system means a system that is described by the laws of quantum mechanics. According to the current general scientific view, the phenomena occurring in such systems—on which random generation is then based—are truly random. Examples are decay processes in radioactive materials.

Classical physical systems, in contrast, are described by the deterministic laws of (classical) physics. There can be a variety of reasons why these systems can nevertheless be unpredictable. For systems with many degrees of freedom, the interactions that arise within the system are often too complex to be predicted with exactness. What is more, the initial state of the system can often not be determined exactly. This fact has further impacts in the case of so-called chaotic systems. In such systems, tiny changes in the initial state lead, in the course of time, to widely differing and unpredictable states of the system.

In order to assess a cryptographic bit source, it must be compared with the properties of the practically secure cryptographic bit source defined above. This includes a statistical assessment of the bit strings generated and a check of the possibilities of so-called side-channel attacks. These attacks actually take on great importance when random number generators are deployed in embedded systems. A side-channel attack is an attempt to predict the numbers generated by the generator or to influence their generation. This happens non-invasively by determining measured values from the environment of the generator (passive attacks) or by deliberately influencing the environment (active attacks). A further exacerbation of such an attack is represented by invasive side-channel attacks (for example, a hole might be drilled in the IC in order to measure signals there). Typical passive, noninvasive attacks are for example the measurement of the electromagnetic radiation from, or the power consumption of, the generator.

A variety of statistical tests are available for the statistical assessment of bit strings generated by a generator (e.g., Killmann, Wolfgang, and Werner Schindler, "*A Proposal on Functionality Classes and Evaluation Methodology for Physical Random Number Generators*" (Ein Vorschlag zu: Funktionalitätsklassen und Evaluationsmethodologie für physikalische Zufallszahlengeneratoren), Bundesamt für Sicherheit in der Informationstechnik (2001); Marsaglia, G., "*Diehard: A Battery of Tests for Randomness*," URL http://stat.fsu.edu/pub/diehard/ (1996); Ruhkin, A. L., J. Sotot, J. Nechvatal, M. Smid, M. Levenson, D. Banks, M. Vangle, S. Leigh, S. Vo and J. Dray, "*A Statistical Test Suite for the Validation of Cryptography Random Number Generators*," National Institute of Standards and Technology, Gaithersburg, Md. (2000); Schindler, Werner, "*Evaluation Criteria for True (Physical) Random Number Generators Used in Cryptographic Applications*," in Kaliski, Burton S., Jr., Çetin Kaya Koç and Christof Paar (Eds.), "*Cryptographic Hardware and Embedded Systems—CHES 2002, 4th International Workshop, Redwood Shores, Calif., U.S.A., Aug. 13-15, 2002, Revised Papers*," Lecture Notes in Computer Science, Vol. 2523, Springer (2003), ISBN 3-540-00409-2, pp. 1-2).

In principle, the problem of defining the concept of a random finite sequence arises in the assessment of these finite bit strings. According to Kolmogorov (Kolmogorov, Andrei N., "*Three Approaches to the Quantitative Definition of Information*," in Problems in Information Transmission 1 (1965), No. 1), a finite sequence is random if it cannot be compressed. This means that the length of its shortest algorithmic description with reference to a selected computer model is of the same order of magnitude as the length of the sequence itself (this is the so-called Kolmogorov complexity of a sequence, with the Turing machine as the computer model). The basic idea here is that a sequence that is compressible must exhibit regularities in order to permit compression. Random sequences thus exhibit no regularities in this sense. Unfortunately, this concept does not lead to direct tests for the randomness of strings because the Kolmogorov complexity is not computable in the sense of computability theory.

The statistical tests are capable only of testing a bit string with respect to certain properties attributed to random (finite) bit strings. These properties are often derived from intuitive notions based on the general understanding of randomness. In fact, it can be shown of a number of tests that they are passed by bit strings random in the Kolmogorov sense (Li, Ming, and Paul Vitannyi, *An Introduction to Kolmogorov Complexity and Its Applications, Springer-Verlag (*1993), ISBN 0-387-94053-7).

Physical random number generators are known in a multiplicity of variants from the existing art. At the beginning of the development of random number generators, primarily external random number generators (i.e., those not embedded in ICs), were developed. A considerable selection of external random sources are available for this purpose. In present-day external random number generators, a multiplicity of random sources are used, for example radioactive sources, electronic thermal noise in resistances, or random events in the environment (e.g., time intervals between key presses on a keyboard).

It is only quite recently that random number generators have been embedded in commercial ICs. Here an important role is played by the kind of random source, its surface size on the IC, technical implementation and miniaturization. Up to now, however, hardly any note has been taken of the immunity of random number generators to side-channel attacks. Examples of implemented embedded random number generators are found in German Patent Application DE 101 17 362 A1; Cryptography Research, Inc., "*Evaluation of the VIA C3 Nehemiah Random Number Generator*," URL http://www.cryptography.com/resources/whitepapers/VIA_rng.pdf; Cryptography Research, Inc., "*The Intel Random Number Generator*," URL http://www.cryptography.com/resources/whitepapers/IntelRNG.pdf; U.S. patent application 20020186086; U.S. Pat. No. 4,855,690; German Patent DE 101 03 071 A1; Fischer, Viktor, and Milos Drutarovsky, "*True Random Number Generator Embedded in Reconfigurable Hardware*," in Kaliski, Burton S., Jr., Çetin Kaya Koç and Christof Paar (Eds.), "*Cryptographic Hardware and Embedded Systems—CHES* 2002, *4th International Workshop, Redwood Shores, Calif., U.S.A., Aug.* 13-15, 2002, *Revised Papers*," Lecture Notes in Computer Science, Vol. 2523, Springer (2003), ISBN 3-540-00409-2, pp. 415-430, U.S. Pat. No. 5,706,218; International Patent Application WO 03/081417; German Patent Application DE 102 13 269 A1; U.S. patent application 20030185392; European Patent Application EP 1 343 073 A2; Tkacik, Thomas E., "*A Hardware Random Number Generator*", in Kaliski, Burton S., Jr., Çetin Kaya Koç and Christof Paar (Eds.), "*Cryptographic Hardware and Embedded Systems—CHES* 2002, *4th International Workshop, Redwood Shores, Calif., U.S.A., Aug.* 13-15, 2002, *Revised Papers*," Lecture Notes in Computer Science, Vol. 2523, Springer (2003), ISBN 3-540-00409-2, pp. 450-453.

The invention begins from a so-called inverter chain random number generator as is disclosed in a wide variety of embodiments according to the existing art. By way of example, reference is made to German patent application DE 102 13 269 A1.

Referring to FIG. 15*a*, the fundamental component of these random number generators is a so-called ring oscillator 1508. It comprises the serial connection of an odd number K of inverters $inv_1, inv_2, \ldots, inv_K$ (logical NOT gates), the output of the last inverter $inv_K$ being connected to the input of the first inverter $inv_1$. As a result of the delay times of the individual inverters $inv_1, inv_2, \ldots, inv_K$, a periodic oscillation comes about only when the number K of gates $inv_1, inv_2, \ldots, inv_K$ is odd.

In order to start and stop this oscillation, the first inverter $inv_1$ can be replaced by a NAND gate $nand_1$ with control input start/stop as shown in FIG. 15B. If this control input start/stop is set to a logical one ("1"), ring oscillator 1509 begins to oscillate.

FIG. 16A depicts a ring oscillator 1602 for K=3 having two inverters $inv_2, inv_3$ and one NAND gate $nand_1$. FIG. 16B depicts an idealized signal trace at input 1611 and output 1612 of an inverter inv whose delay time is τ. If it is assumed that gates $nand_1, inv_2, inv_3$ in the ring oscillator 1602 of FIG. 16A exhibit such an idealized behavior, then FIG. 16C depicts the idealized signal trace of the ring oscillator 1602 at points S, B, C and A=A' after input S has been set to "1" for an elapsed time T.

For a technical implementation of the ring oscillator 1602 with K=3 using the CMOS component 74HCT04 (with no input NAND gate, FIG. 17A), FIG. 17B illustrates signal trace 1714 recorded with an oscilloscope at point A' as illustrated in FIG. 17A. As is implied by the enlarged detail of the signal trace 1714 (in FIG. 17B), thermal motion of the electrons in the conductors of circuit 74HCT04 adds a thermal noise signal. FIG. 17C depicts an envelope 1715 of the noisy oscillation signal 1714 observed over a longer time interval t. As can be remarked, the noise in the flanks of the signal 1714 leads to the decision level being exceeded earlier or later than in the case of the noise-free signal. This temporally random shift in the flanks is called "jitter". The difference between the maximum possible flank shift, observed with reference to a fixed time $t_1$ (FIG. 17C), is identified by the reference character Δ. The magnitude of this difference Δ increases with the distance of the flank from the reference time $t_1$. This phenomenon is known as "jitter accumulation."

The oscillation signal 1714 of the ring oscillator 1702 from FIG. 17A, with a frequency f of approximately 25 MHz, averaged 512 times over a duration of 0.2 s, is illustrated in FIG. 18. Envelope 1802 of this averaged signal depicts the behavior of the autocorrelation for various temporal intervals from the trigger point. As can be seen from FIG. 18, the signal 1714 is not completely decorrelated by accumulated jitter until after approximately 0.28 s.

This indicates that the generated bits would be decorrelated, and thus may be used for a random bit source, only at a sampling rate ν of 3 Hz (or less). In order to increase the maximum possible rate $v_{max}$ of generated random bits, a plurality of ring oscillators with various periods (i.e., with various values for K) can be combined. FIGS. 19A and 19B depict two embodiments of circuit arrangements based on a number L of ring oscillators 1901-1906. Here a parity check of the outputs (so-called XORing) is performed in each case. In concrete terms, this indicates that the outputs of the respective ring oscillators 1901-1906 are connected to the inputs of an XOR gate xor so that a "1" signal is generated at its output only if an odd number of logical "1" signals are present at the outputs of the ring oscillators 1901-1906. An even number of logical "1" values will generate a "0" signal at the output of the XOR gate. For this reason, the signal at the output of XOR gate xor is referred to as parity signal PS in what follows.

The two circuits of FIG. 19A and FIG. 19B differ solely in the configuration of the start/stop inputs of ring oscillators 1901-1906. In the first embodiment according to FIG. 19A, the start/stop inputs of the individual ring oscillators 1901-1903 are driven together. The second possibility, illustrated in FIG. 19B, is to drive the inputs separately to shift the initial phases of the individual oscillation signals relative to one another.

FIG. 20A illustrates a circuit 2002 with parity checking of two ring oscillators 2024, 2025 with a common start/stop signal. As can be seen in FIG. 20B and FIG. 20C, period P of parity signal PS 2029 remains constant. As a result of slow phase shifts of individual ring oscillator signals 2027, 2028, the signal trace 2029 of parity signal PS changes, within a period P over longer time intervals, as can be seen clearly in FIG. 21A. Over a time of approximately 0.2 s in FIG; 21B, envelope 2130 of parity signal PS, 2029 displays a more-variable autocorrelation that is smaller than the autocorrelation of the individual components (see FIG. 18). This parity checking of ring oscillators is used in many implementations of random number generators. The correlations cannot be completely removed with this technique, and so additional, rate-reducing, deterministic post-processing becomes unavoidable.

There is a need for a random number generator that does not require deterministic post-processing.

SUMMARY OF THE INVENTION

An object of the invention is to provide a random number generator that may be implemented with standardized components of conventional large-scale integrated circuits (e.g., logic gates).

A further object of the invention is to provide a random number generator that may be built up with the use of the fewest possible components (low cost, small surface area and low power consumption).

Yet another object is to provide a random number generator that may be embedded on the IC as a freestanding, independent unit protected from the influence of other units.

Still yet another object is to provide a random number generator that may be turned on and off independently of the other units on the IC.

Quick restoration of functionality after turn-on (short warm-up time)

Highest possible number of random bits generated per unit time (high rate)

Robustness with respect to ambient conditions (temperature, electromagnetic interference, variations in power supply voltage, etc.)

Robustness with respect to invasive and noninvasive attempts at manipulation (attacks)

Passive attacks

Active attacks

Satisfaction of statistical tests used to assess the quality of the randomness of both generated bits As little deterministic post-processing of generated random numbers as possible Capability of a functionality and quality test during operation (online test)

The invention begins from a method for generating random numbers in which oscillating digital output signals of equal or unequal periodicity are generated by at least two ring oscillators and in which there is generated an external parity signal representing a logical state which external parity signal takes on the logical state "1" when an odd number of the output signals have the logical state "1" and takes on the logical state "0" otherwise. The external parity signal is fed back to an external parity input of each of the respective ring oscillators. The external parity signal can be employed for generating random bits by sampling it. Because of the feedback of the parity signal to the (external parity) input of the respective ring oscillator, the autocorrelation of the parity signal is significantly reduced in relation to the method without feedback. For this reason, the rate of generated random bits can be significantly increased with the present invention.

A random number generator according to the invention comprises, at least two ring oscillators preferably constructed from independently free-running inverter chains with feedback, having an odd number of series-connected inverters. The ring oscillators generate oscillating digital output signals of equal or unequal periodicity. A first parity signal generating circuit, preferably formed by an exclusive-OR gate, generates the external parity signal. The external parity signal is feedback to an external parity input of each of the respective ring oscillators (formed from inverter chains).

In a preferred embodiment, for each ring oscillator there is generated in each case an internal parity signal representing a specified logical state (e.g., "1") when either the output signal of the respective ring oscillator or the signal fed back to the external parity input of the respective ring oscillator takes on a specified logical state (e.g., "1"). These internal parity signals can in turn be converted, by further parity signal formation of the kind described above, to a further parity signal that can be employed in the manner described above for generating random bits by sampling it. As a result of this further parity formation, a signal is produced whose autocorrelation is once again significantly reduced in comparison with the external parity signal. At the same time, the possible sampling rate for generating random bits can be significantly reduced once again in this way.

For generating the internal parity signals, the random number generator comprises the appropriate parity signal generating circuits. These preferably comprise exclusive-OR gates each having an external parity input and an output signal input. A signal derived from the external parity signal is present at the external parity input, for example the parity signal itself or a signal whose generation will be described in detail in what follows. The respective output signal of the respective ring oscillator is present at the output signal input. In order to generate the further parity signal, the random number generator comprises further a parity signal generating circuit, which generate the further parity signal representing a logical state "0" or "1" when an odd number of internal parity signals take on a specified logical state (e.g., "1"). In appropriate fashion, these circuits also preferably comprise an exclusive-OR gate (XOR gate) at whose inputs the internal parity signals are present.

As has already been mentioned, a starting problem can arise in particular in the case of ring oscillators formed from inverter chains. In order to avoid this problem the random number generator includes a starting circuit that generates a start signal (e.g., a logical "1") and supply it to a start/stop input of at least one of the ring oscillators so that this ring oscillator is excited into oscillation. To this end, this ring oscillator has a NAND gate with two inputs instead of an inverter on the input side. The one input and the output of this NAND gate are connected to the rest of the inverter chain instead of the input and the output of the removed inverter. The other input forms the aforementioned start/stop input to which the start signal is supplied.

In principle, all the ring oscillators can be started separately via corresponding start/stop inputs. It has been found to be favorable in many cases, however, if all ring oscillators are excited into oscillation, preferably at the same time, with the aid of the same start signal (e.g., logical "1"). To this end, for example, instead of an inverter on the input side, all ring oscillators are each provided with a NAND gate whose start/stop inputs are connected to one another for the supplying of the start signal (e.g., a logical "1").

Another starting problem can arise depending on the constellation. This starting problem can be eliminated by connecting an inverter in front of at least one external parity input, to which inverter the external parity signal is supplied. First, this inverter causes a delay of the signal at this external parity input; second, the signal at this external parity input with inverter connected in front experiences a reversal of polarity. The latter case leads to a reversal of polarity at the input of the corresponding ring oscillator and thus to an inception of oscillation in this ring oscillator. The other connected ring oscillators are also excited into oscillation as a consequence.

In certain applications it has proven advantageous if inverter chains differing in the number of inverters are connected in front of all external parity inputs, to which inverter chains the external parity signal is supplied. An oscillation of the circuit arrangement then comes about if the sum of the periodicity of an output signal generated by a first of the ring oscillators, equal in value to an odd multiple of a delay time of a gate (inverter, NAND gate, XOR gate), plus the delay time duration of the external parity signal at the external parity input of the first of the ring oscillators, equal in value to a multiple of the delay time, equals an odd multiple of the delay time and if the sum of the periodicity of an output signal generated by a second of the ring oscillators, equal in value to an odd multiple of the delay time, plus the delay time duration of the external parity signal at the external parity input of the second of the ring oscillators, equal in value to a multiple of the delay time, equals an even multiple of the delay time.

As was already mentioned above, both the external parity signal and also the further parity signal can be employed for generating random bits. The random number generator can therefore sample the external parity signal at a specified rate for generating random bits and/or sample the further parity signal at a specified rate for generating random bits.

The maximum sampling rate can be further increased if a plurality of random number generators of the kind described above are combined. Starting from random number generators that generate external, in particular sampled, parity signals and/or that generate further, in particular sampled, parity signals, it is possible by additional or repeated parity formation from these parity signals (arbitrary variations of parity signal formations are possible) to form random number generators in which the (super) parity signal provided for random number generation has an autocorrelation reduced to virtually any degree.

Further random number generation requires sampling. Here it is of no import whether the external parity signals or the further parity signals or other parity signals of lower order are synchronously sampled at a specified rate for generating random bits or the (super) parity signal of highest order is sampled at the specified rate for generating random bits.

Sampling can take place at temporally constant intervals, but provision is also made according to an aspect of the invention for sampling to be performed at random, nonuniform sampling intervals. For example, random sampling can be achieved if sampling is performed at a time when a random bit randomly generated by one of the random generators described above takes on a predetermined logical state (e.g., "1").

For example, sampling can be effected with a D-flip-flop driven by a pulse from a clock, in particular from an astable multivibrator (in the case of temporally constant sampling intervals) or by a ring oscillator of the kind described above with feedback (in the case of temporally random sampling intervals).

These and other objects, features and advantages of the present invention will become more apparent in light of the following detailed description of preferred embodiments thereof, as illustrated in the accompanying drawings.

BRIEF DESCRIPTION OF THE DRAWINGS

FIGS. 16A-16C depict an example of the mode of functioning of a ring oscillator according to the existing art; including a ring oscillator for K=3 (existing art); an idealized delay of an inverter; and a trace of an oscillation signal;

DETAILED DESCRIPTION OF THE INVENTION

A basic idea of the invention involves feedback of a parity signal to inputs of individual ring oscillators.

Figure 1:
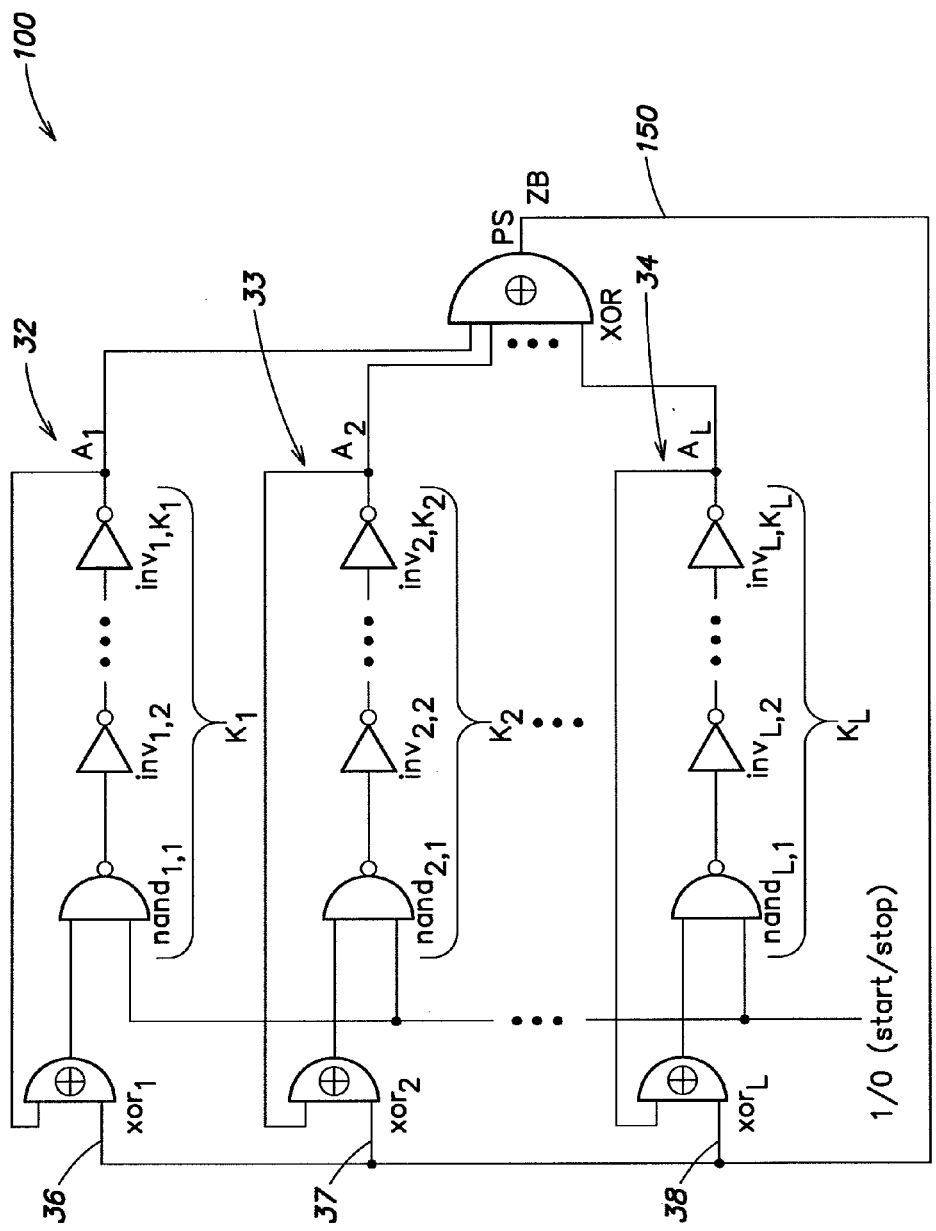
FIG. 1 depicts ring oscillators with feedback of a parity signal.

FIG. 1 depicts a first embodiment of a random generator 100 based on a number L of ring oscillators 32, 33, 34 whose outputs are supplied to corresponding inputs of an XOR gate xor at which a parity signal PS on a line 150 is formed.

As FIG. 1 shows, the supplying of feedback parity signal PS on the line 150 to the individual inputs of ring oscillators 32, 33, 34 is effected via a number of logical XOR gates $xor_1$, $xor_2$, ..., $xor_L$. The input at which the parity signal PS is present in each case will be referred to as external parity input 36, 37, 38.

Figure 2A:
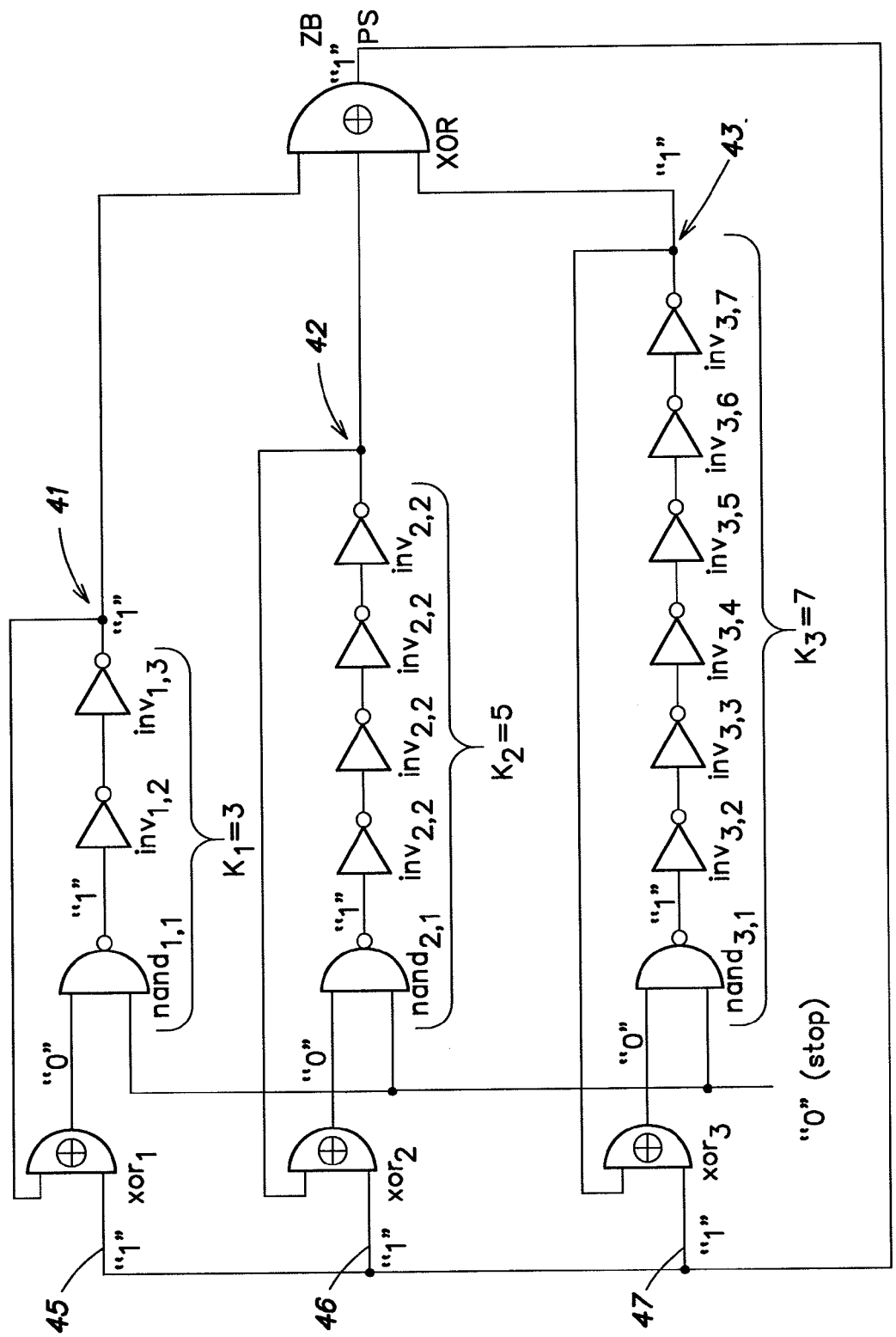
FIGS. 2A and 2B depict an example of the starting problem in the case of ring oscillators with feedback before start, and after start, respectively.
Figure 2B:
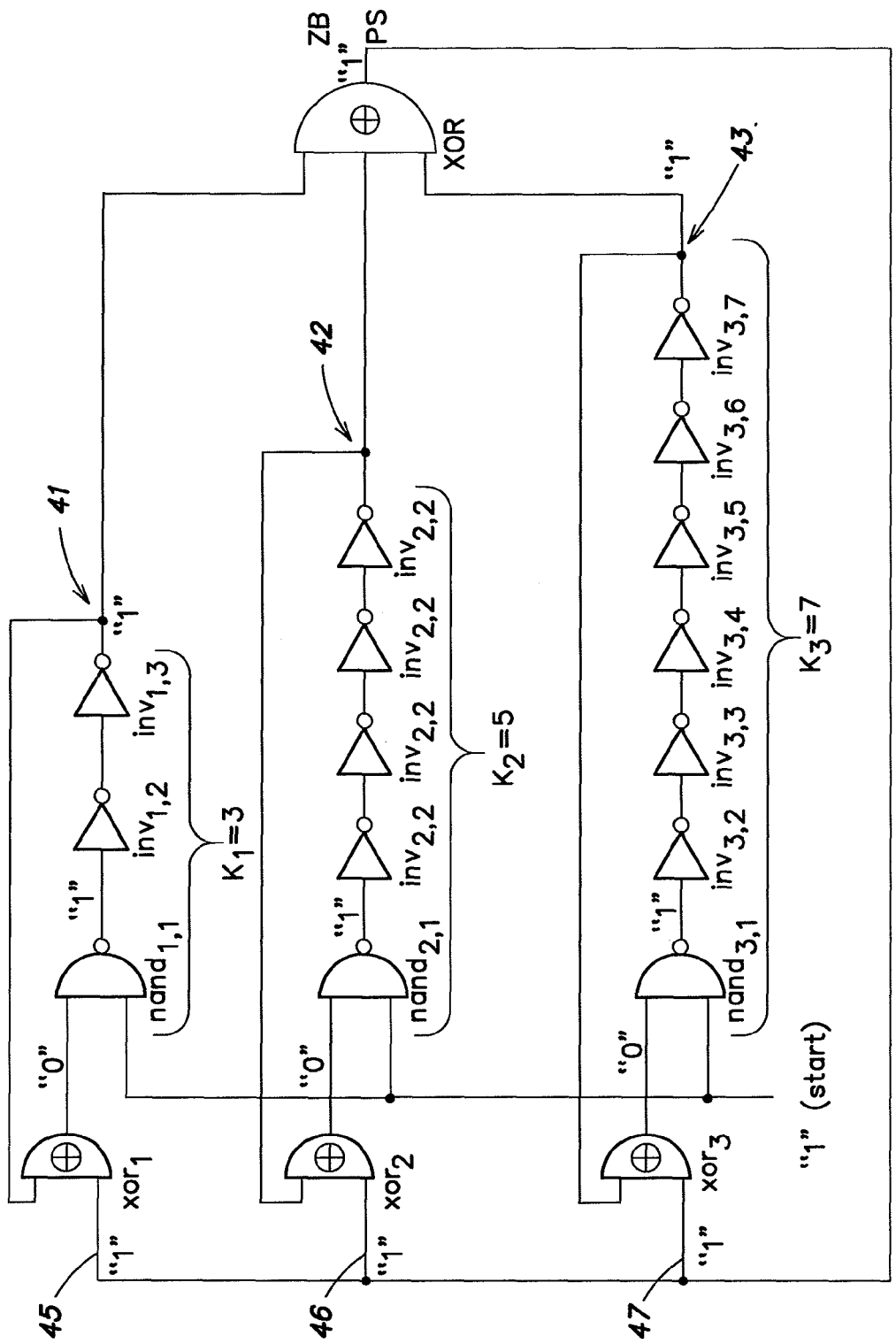

The oscillation of this circuit does not come about for all value combinations of the parameters L, $K_1$, ..., $K_L$, as the example in FIGS. 2A-2B shows for L=3, $K_1$=3, $K_2$=5 and $K_3$=7 and as is described in detail in what follows.

Figure 3A:
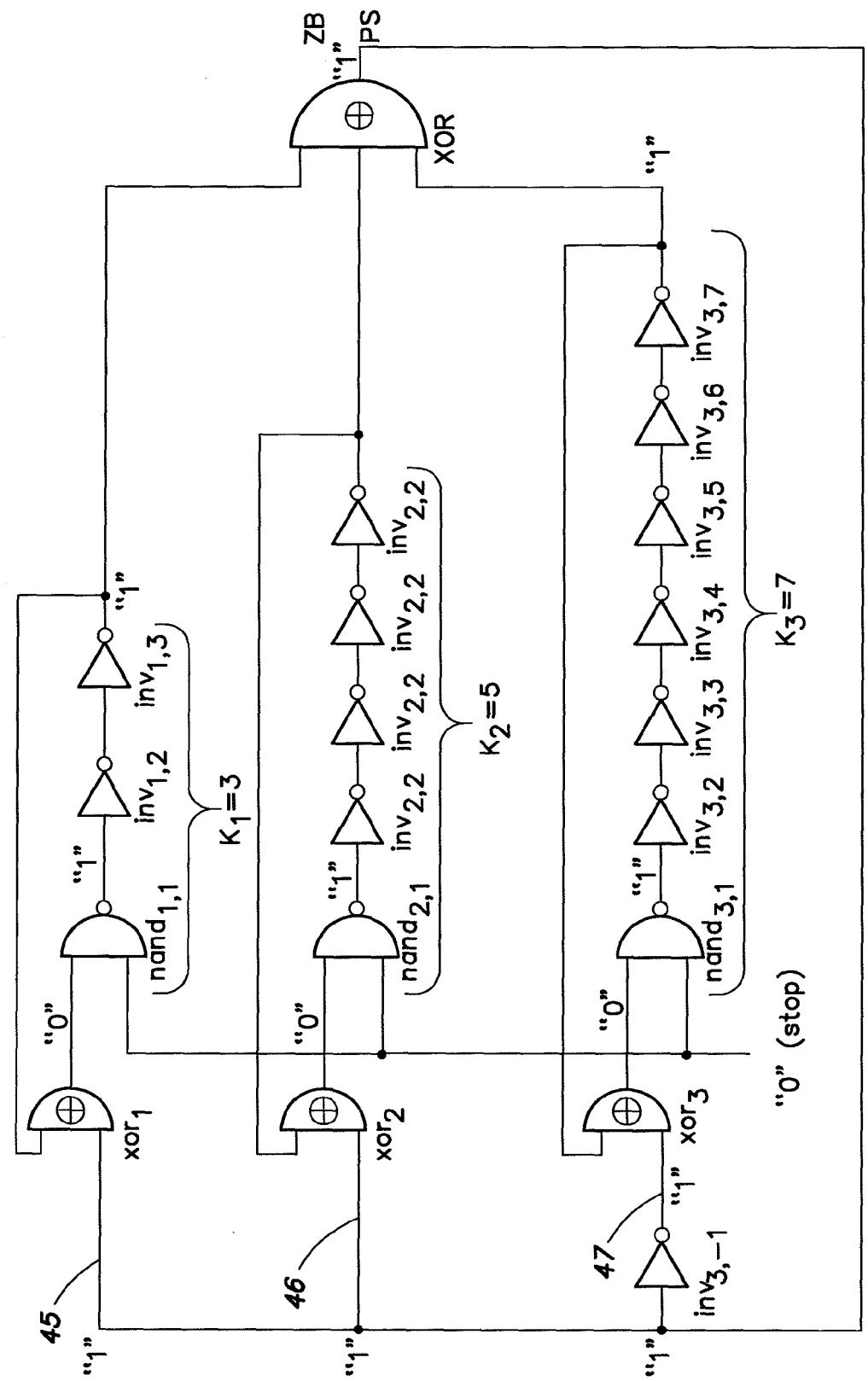
FIGS. 3A and 3B depict a solution of the starting problem from FIG. 2A regarding before start, and FIG. 2B regarding after start, respectively.
Figure 3B:
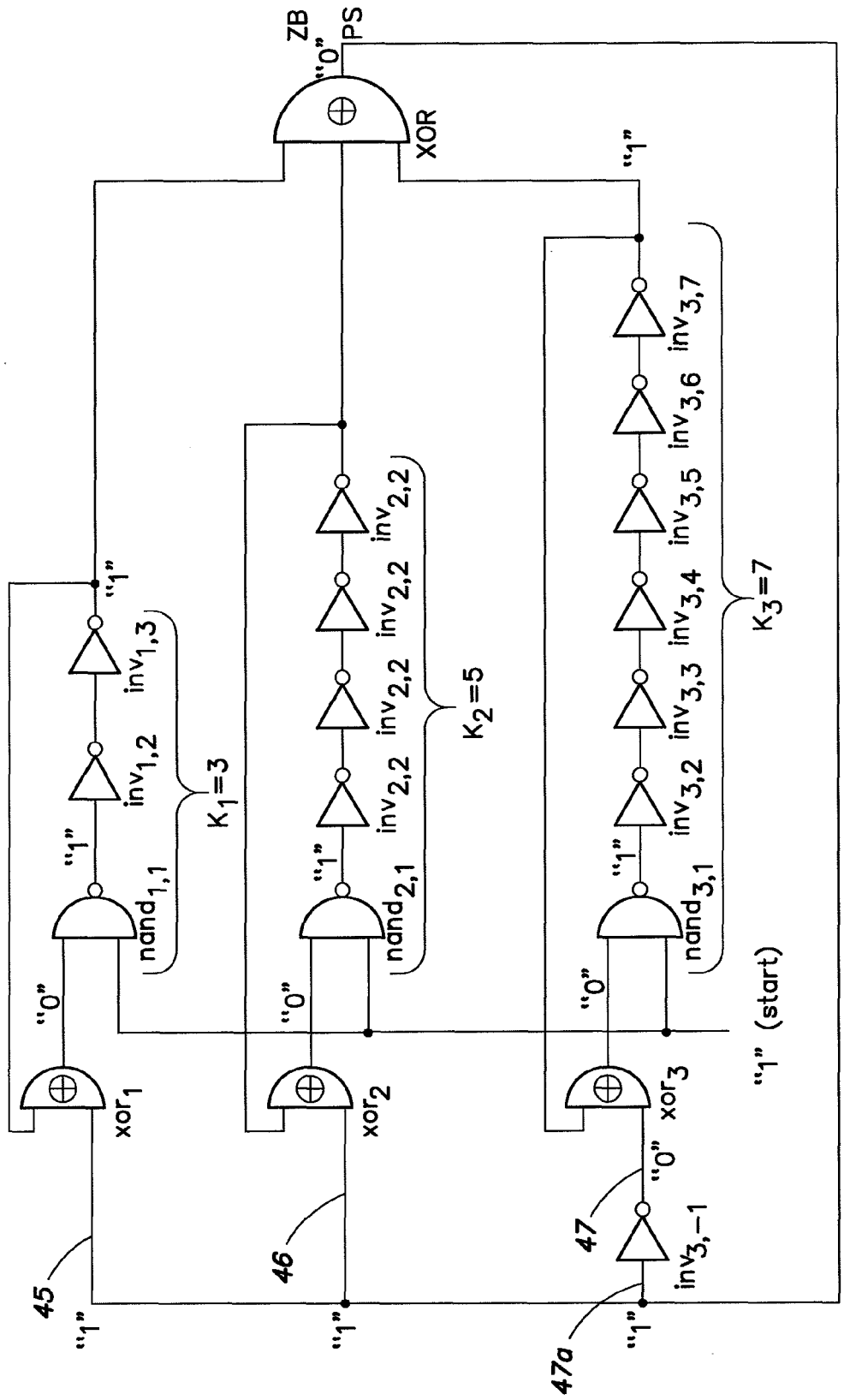
Figure 4A:
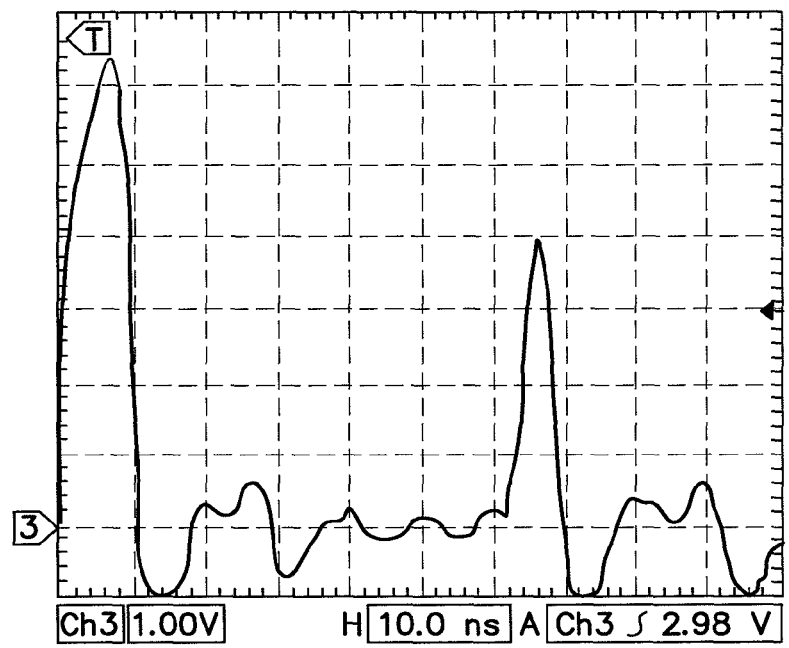
FIGS. 4A-4F depict the signal trace of parity signal PS in the circuit of FIGS. 3A-3B in a time span of 10 ns; 40 ns; 200 ns; 400 ns; 1000 ns; and 2000 ns; respectively.
Figure 4B:
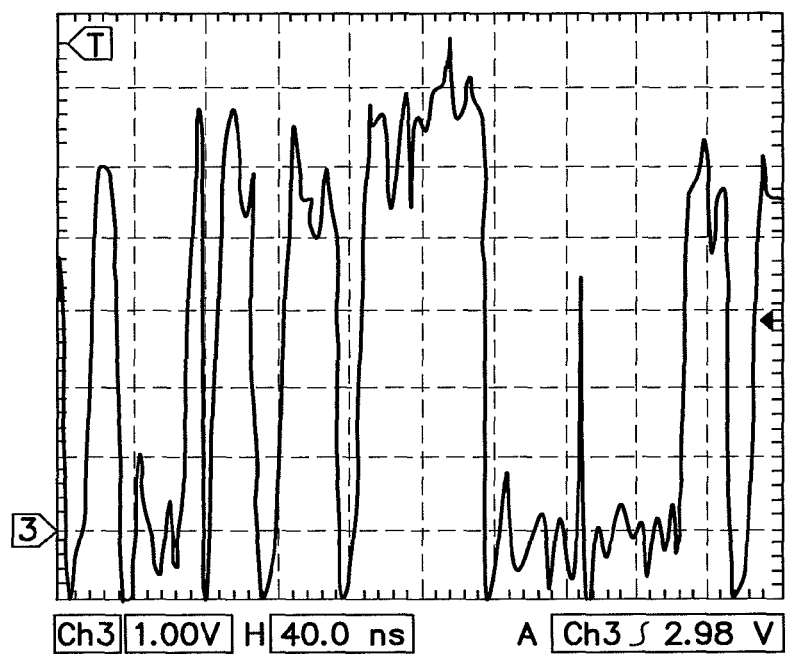
Figure 4C:
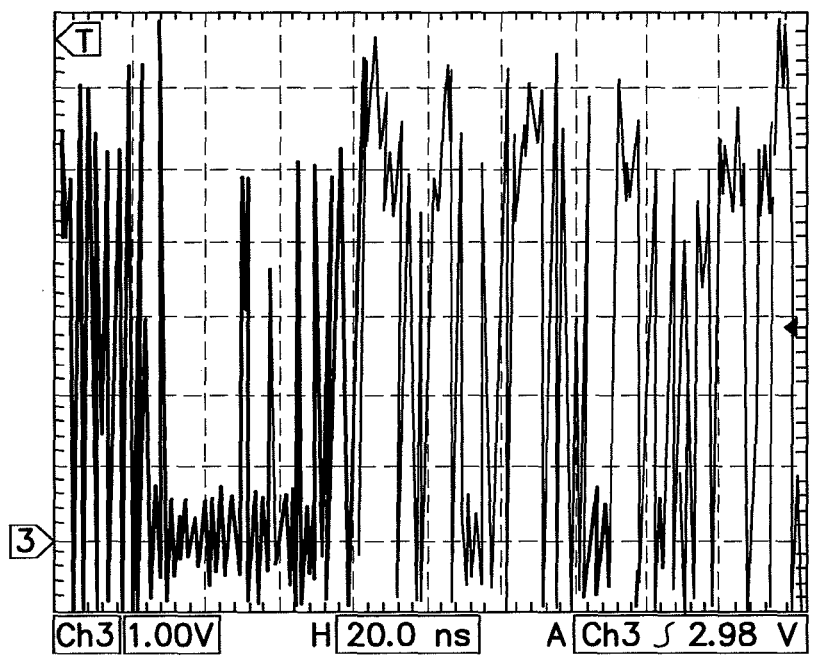
Figure 4D:
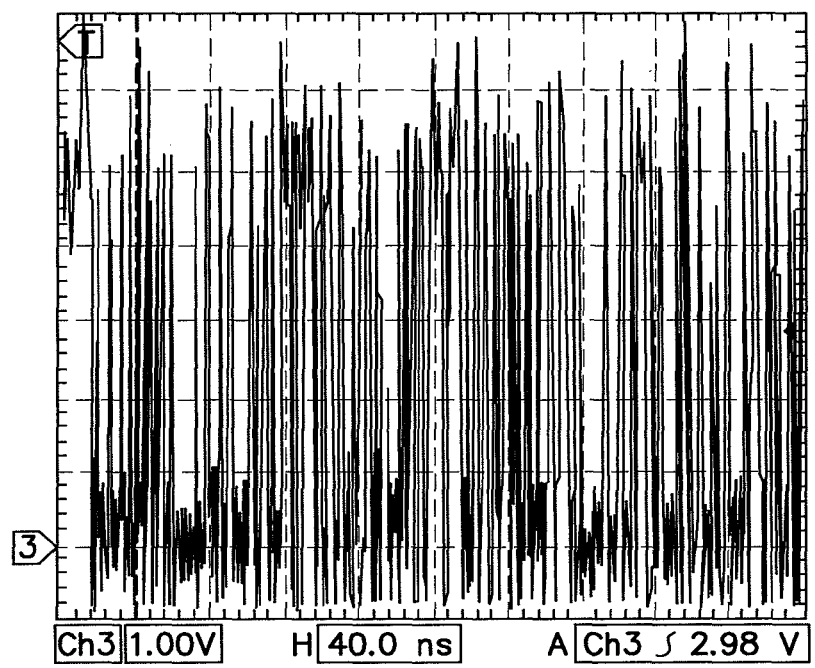
Figure 4E:
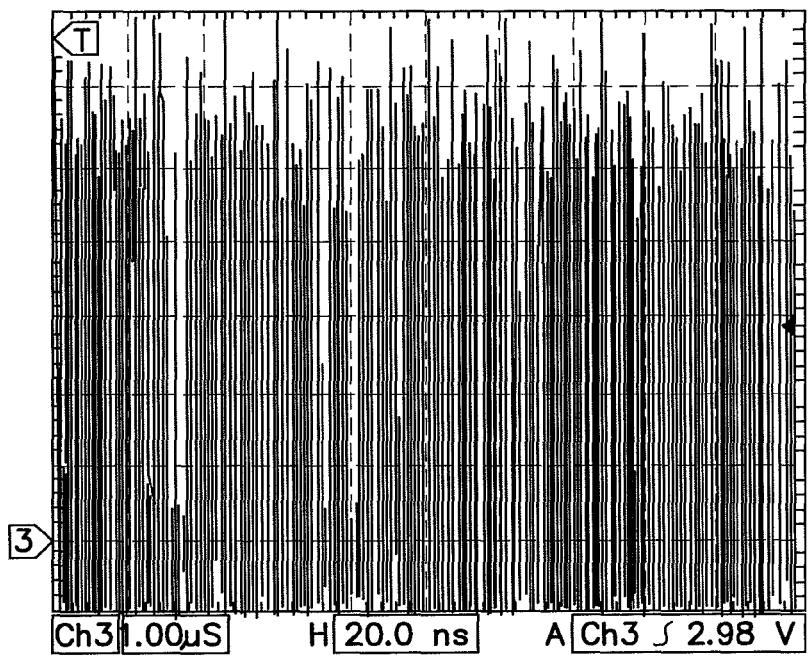
Figure 4F:
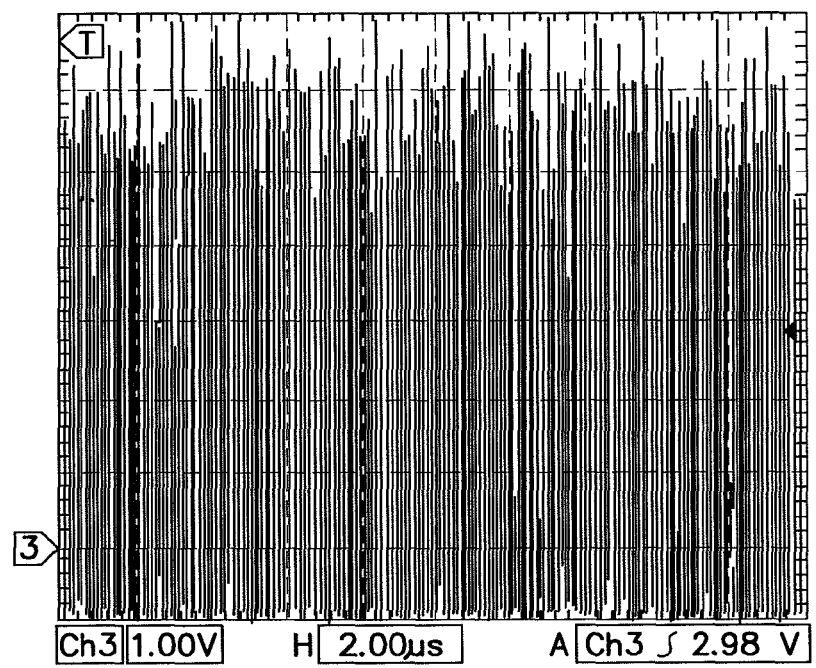

The logical state of the circuit in the off state is illustrated in FIG. 2A. FIG. 2B depicts the state of the circuit after it is turned on (i.e., after the start/stop signal has been set to logical "1"). As should be noted, the circuit is always still in a static (nonoscillating) state because all outputs of the NAND gates $nand_{i,1}$ for i=1, 2, 3 have not changed. This starting problem can be alleviated by inserting a further inverter $inv_{3,-1}$ in front of external parity input 47 of the XOR gate (see FIG. 3).

Figure 5:
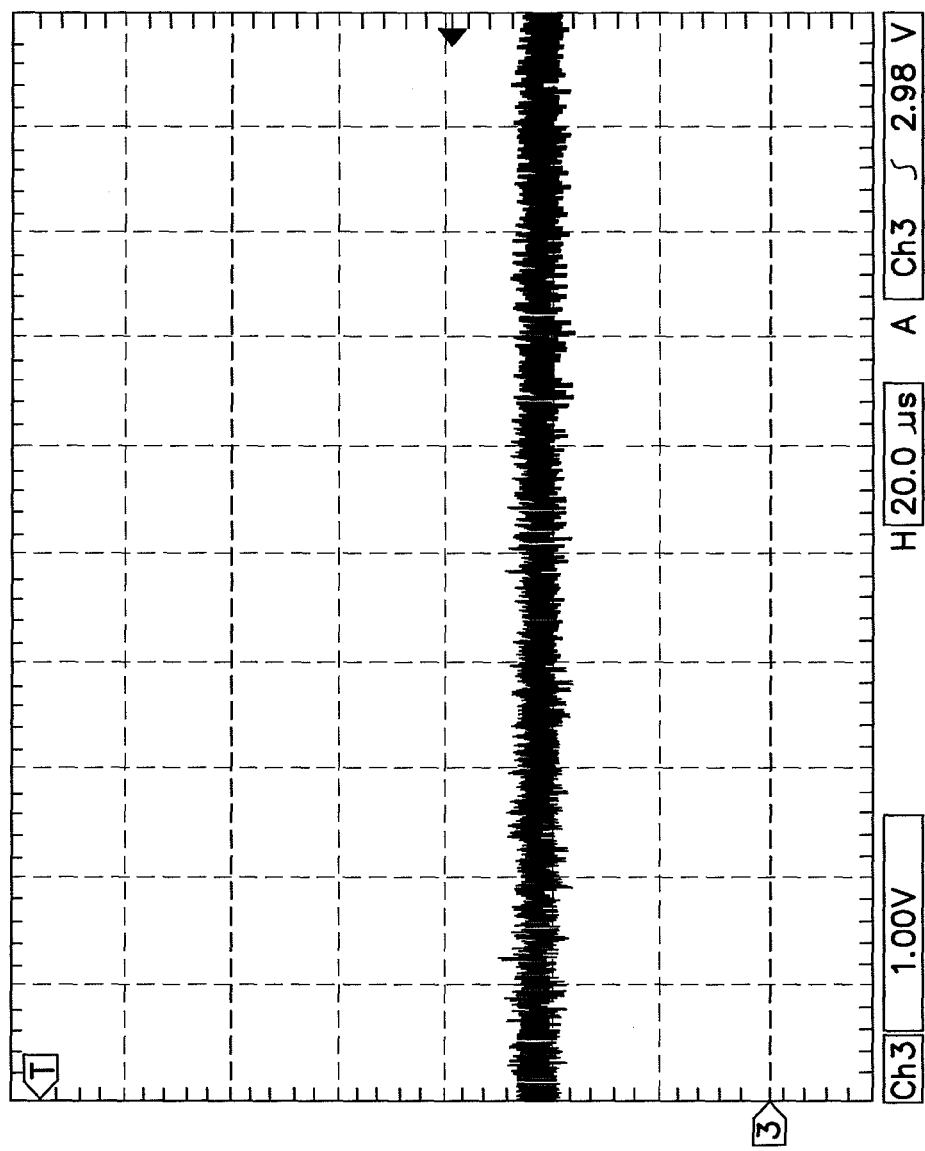
FIG. 5 depicts an averaged parity signal of the circuit from FIG. 3.
Figure 21A:
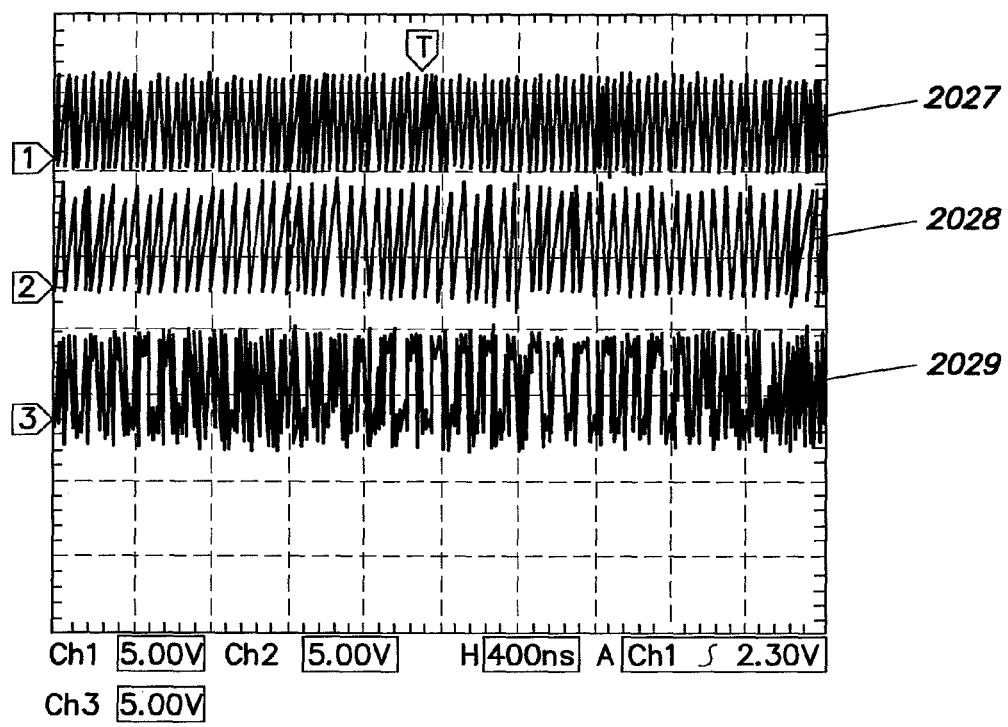
FIGS. 21A and 21B depict an example of the practical performance of the parity check of FIG. 19A, including signals of the individual components and trace of the parity signal; and an averaged parity signal of the circuit of FIG. 20*a*.
Figure 21B:
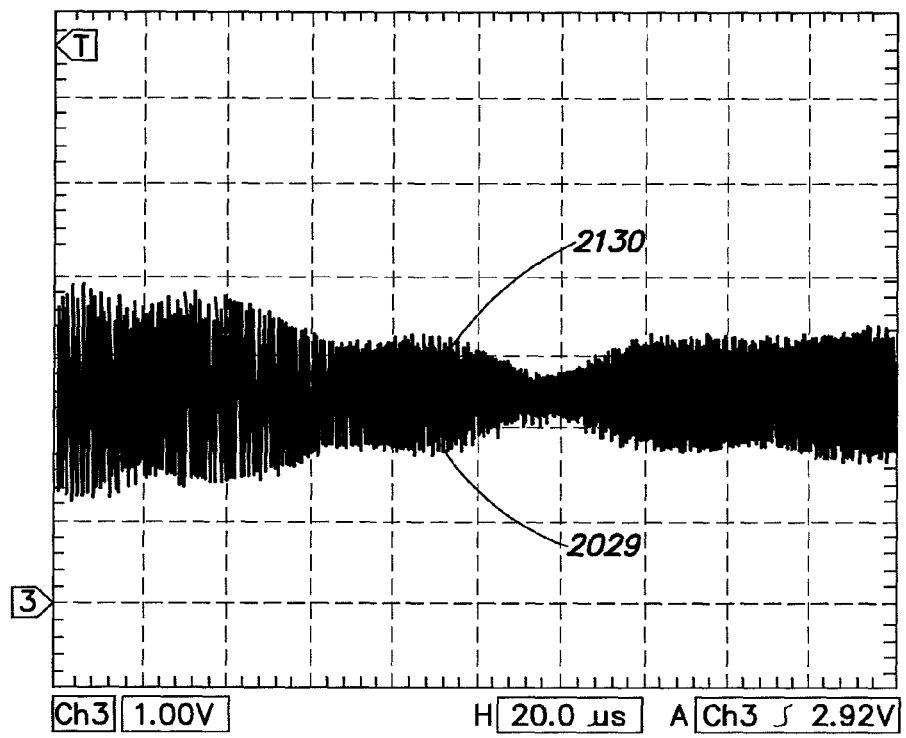

Parity signal PS of this now-oscillating circuit is illustrated for various time intervals in FIGS. 4A-4F. It can be clearly seen that feedback leads to a very irregular form of the parity signal PS for a suitable (oscillating) parameter combination. Averaged parity signal PS shows a very low and constant autocorrelation (see FIG. 5). In comparison with FIG. 21B, this is a significant improvement, making it possible to increase substantially the rate v of generated random bits.

In order to solve the starting problem in general, and in order to introduce additional jitter accumulation, chains of inverters $inv_{i,-j}$, i=1, ..., L, j=1, ..., $M_i$ are introduced in front of XOR gates $xor_i$, i=1, ..., L. The length of the individual chains $M_1$, ..., $M_L$ is variable. In order to make certain that the start/stop problem does not arise, parameters $M_i$ and $K_i$ must be chosen specially. It must be the case that there exists at least one pair i, j with i, j ∈ {1, ..., L}×{1, ..., L} such that one of the two sums $M_i+K_i$ and $M_j+K_j$ is odd and the other is even.

Figure 6:
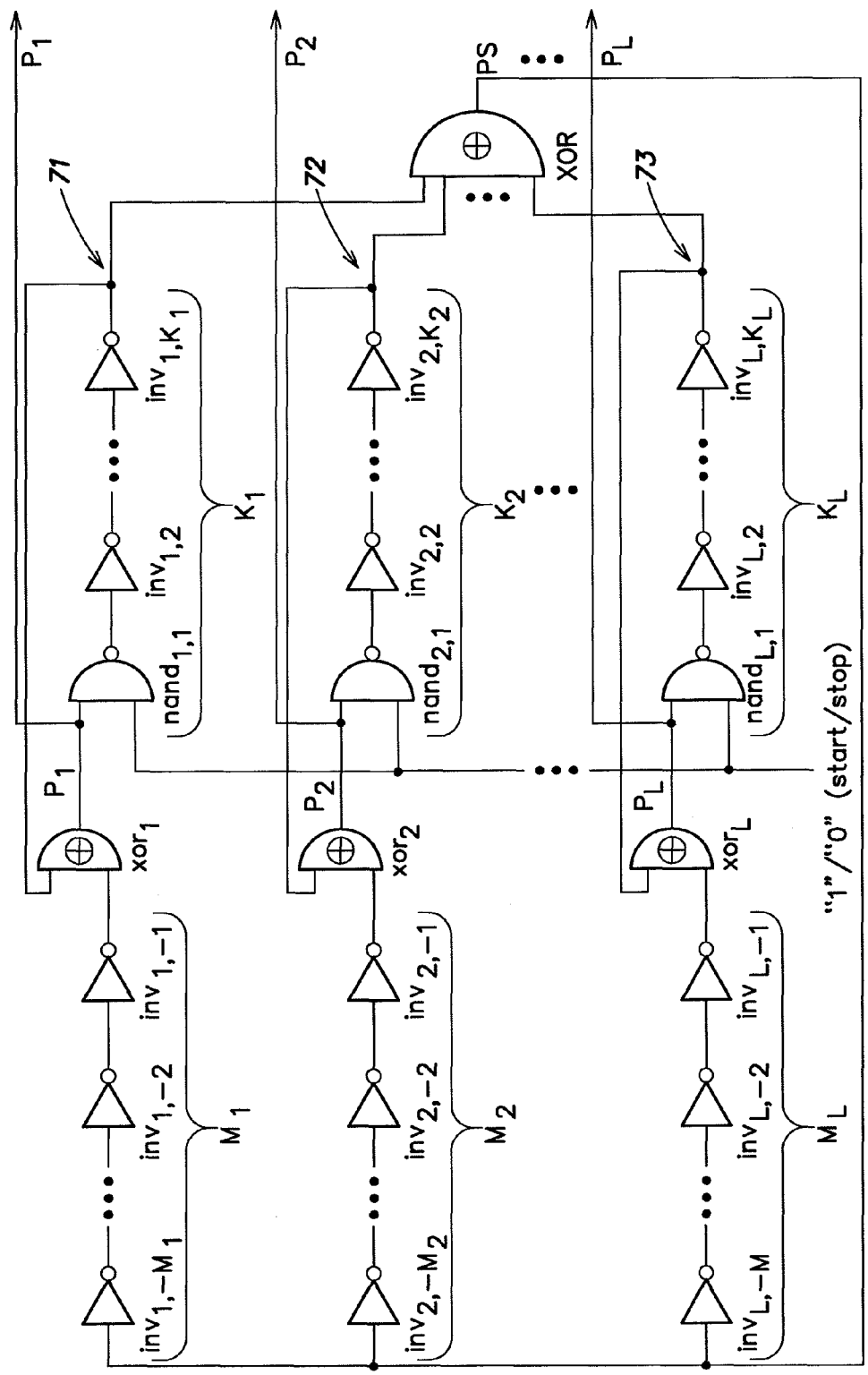
FIG. 6 depicts a general circuit diagram of ring oscillators with feedback (RRO)

FIG. 6 depicts a general circuit diagram with feedback of parity signal PS. In what follows, this circuit will be referred to as ring oscillators with feedback (RRO). The signals at outputs $P_1$ to $P_L$ of XOR gates $xor_1$ to $xor_L$ check the parity of their input signals and are therefore referred to as internal parity signals. For distinction, parity signal PS at the output of the XOR gate XOR will be referred to as the external parity signal.

Figure 7:
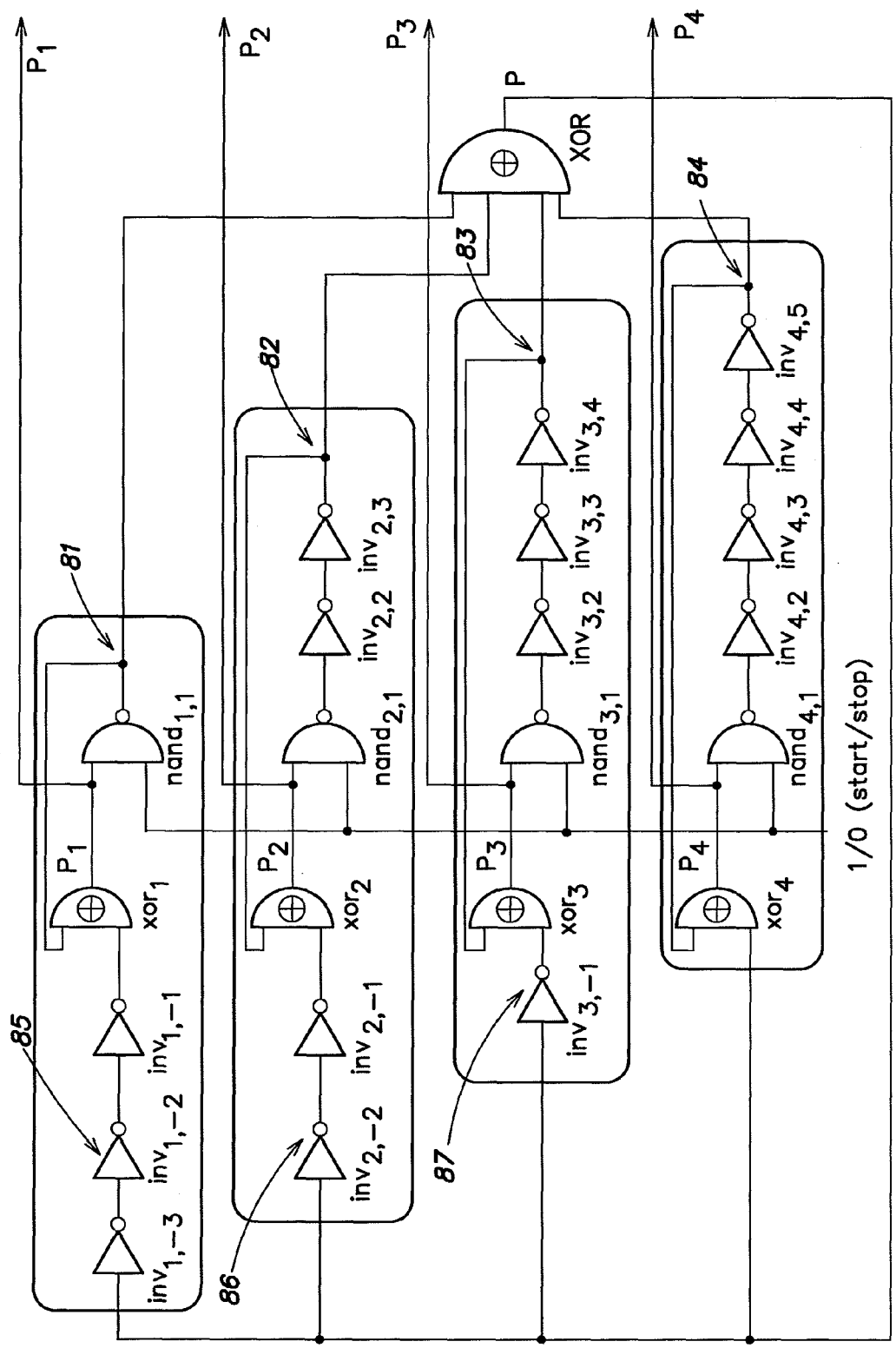
FIG. 7 depicts a circuit of RRO (4; 1, 3, 4, 5; 3, 2, 1, 0)
Figure 8:
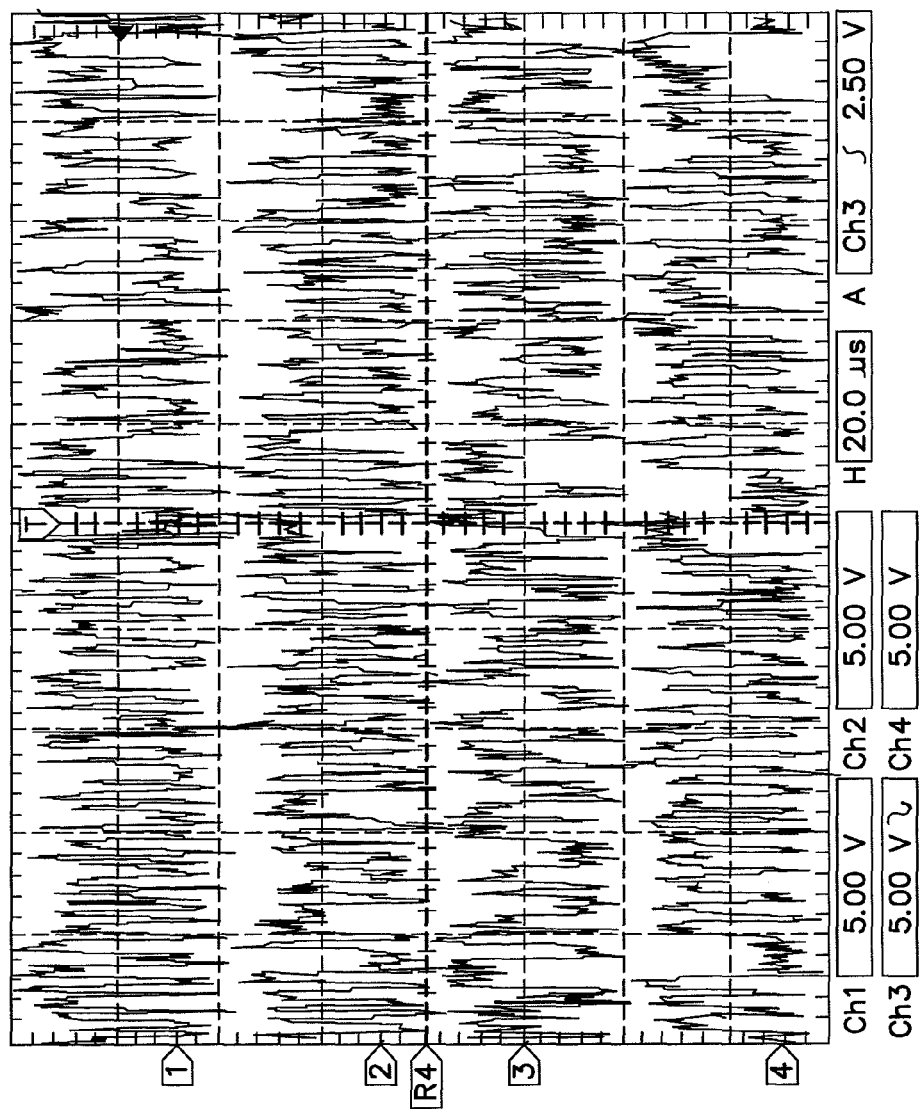
FIG. 8 depicts a plot of internal parity signals of RRO (4; 1, 3, 4, 5; 3, 2, 1, 0) of FIG. 7 at points $P_1$, $P_2$, $P_3$ and $P_4$.

FIG. 7 depicts an instance of the ring oscillator with feedback (RRO) with parameters L=4, $K_1$=1, $K_2$=3, $K_3$=4, $K_4$=5; $M_1$=3, $M_2$=2, $M_3$=1, $M_4$=0. The notation RRO (4; 1, 3, 4, 5; 3, 2, 1, 0) will be employed for brevity. The internal parity signals are quite various because of the construction of the ring oscillator with feedback, as FIG. 8 shows, and can be used for generating random bits.

Figure 9:
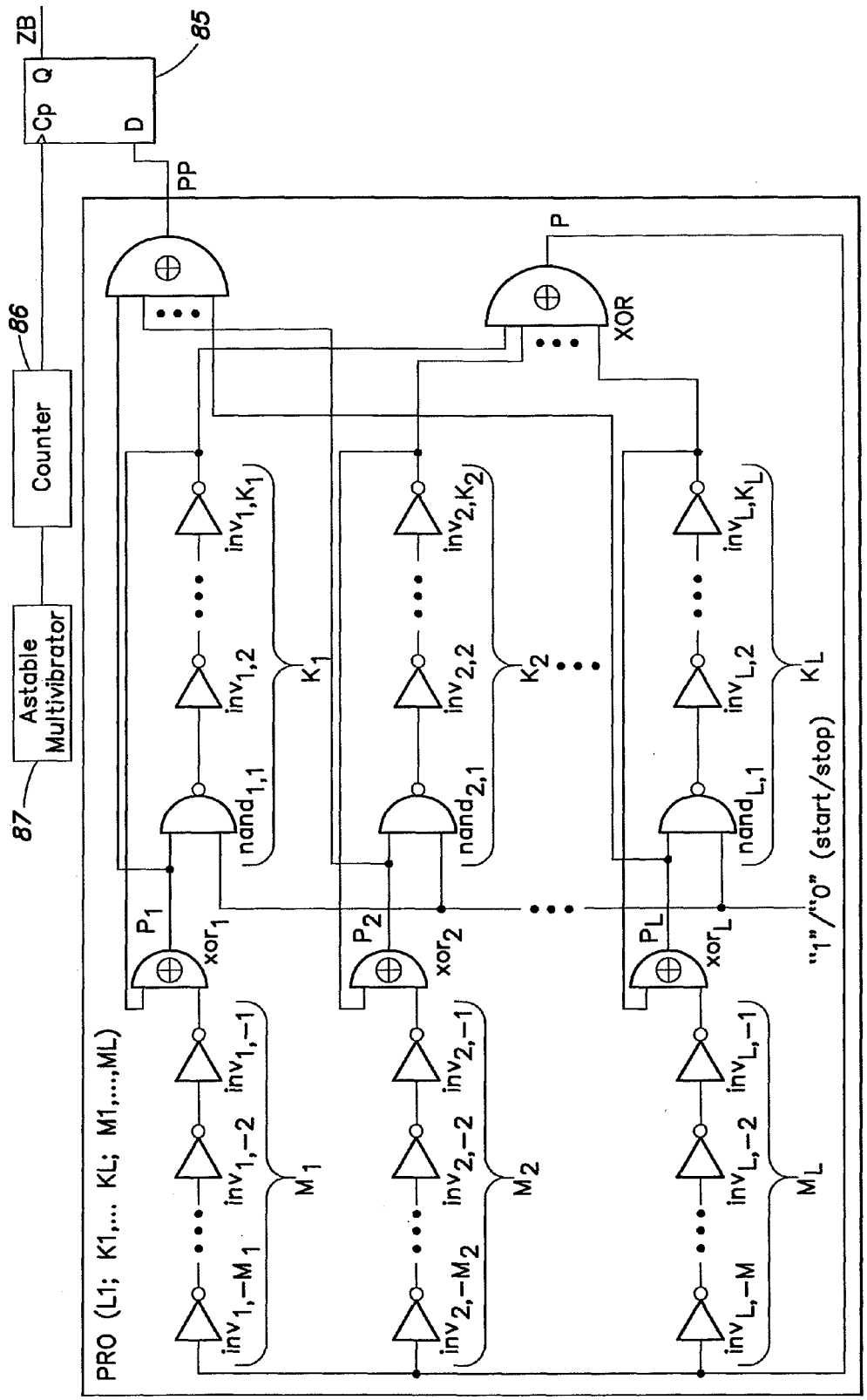
FIG. 9 depicts a random bit generator implemented with RROs.
Figure 10:
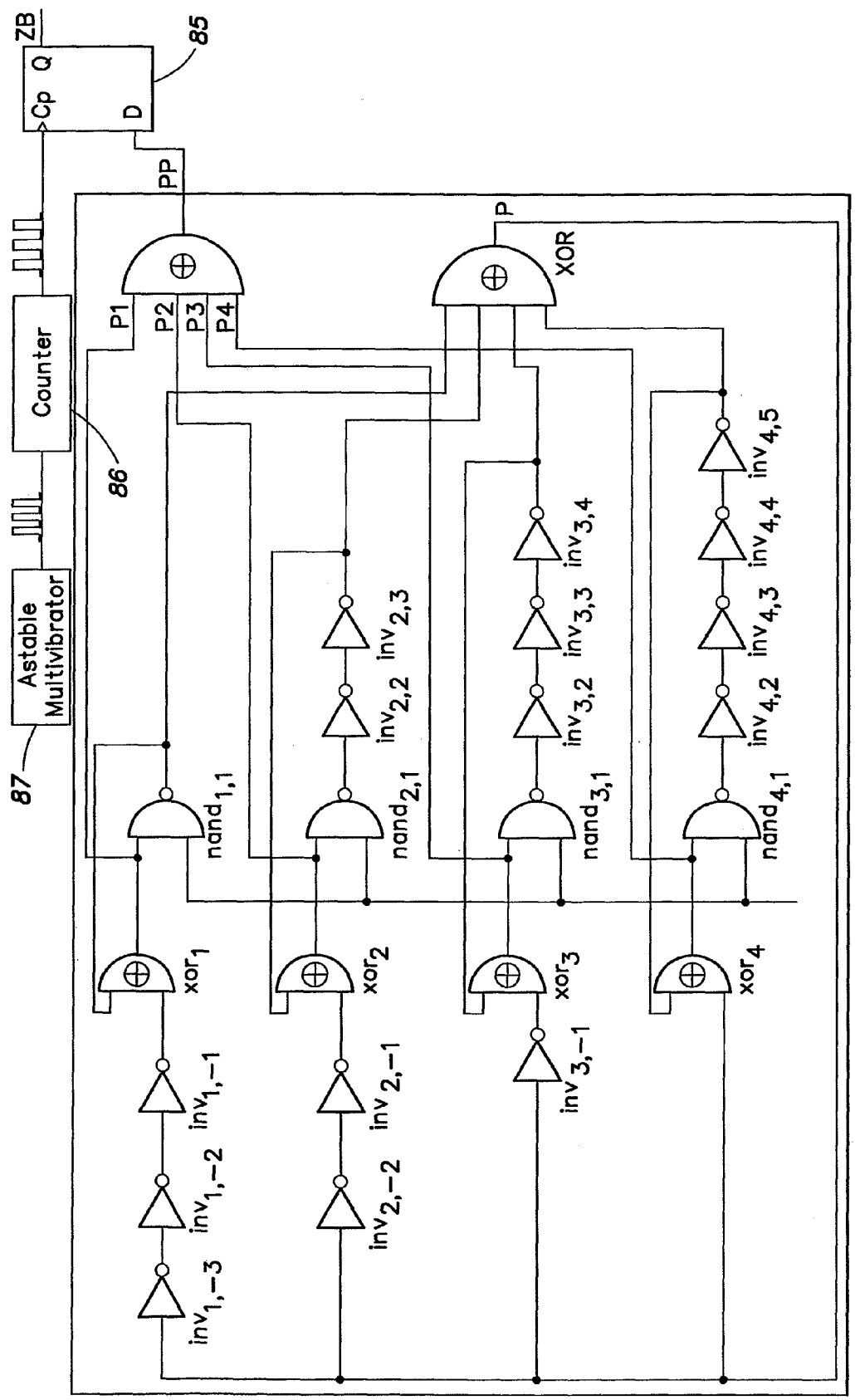
FIG. 10 depicts an example of a random number generator with RRO (4; 1, 3, 4, 5; 3, 2, 1,0)

The quality is further improved by a further parity check PP of the internal parity signals $P_1$, $P_2$, ..., $P_L$, in which a further parity signal PP is generated, and can be employed as a random bit string ZB after sampling, as FIG. 9 illustrates. Sampling is effected with a D-flip-flop 85, which is driven by a periodic clock signal $C_P$. The clock signal $C_P$ can be generated by an astable multivibrator 87 and its period (uniform sampling interval) determined with a binary counter 86. In order to obtain random, non-uniform sampling intervals, the astable multivibrator 87 can be replaced by a ring oscillator with feedback. A random number generator with ring oscillator feedback of configuration (4; 1, 3, 4, 5; 3, 2, 1, 0) with uniform sampling is illustrated in FIG. 10. Statistical tests of this random number generator have revealed little bias and a low correlation of bits 7.

Figure 11:
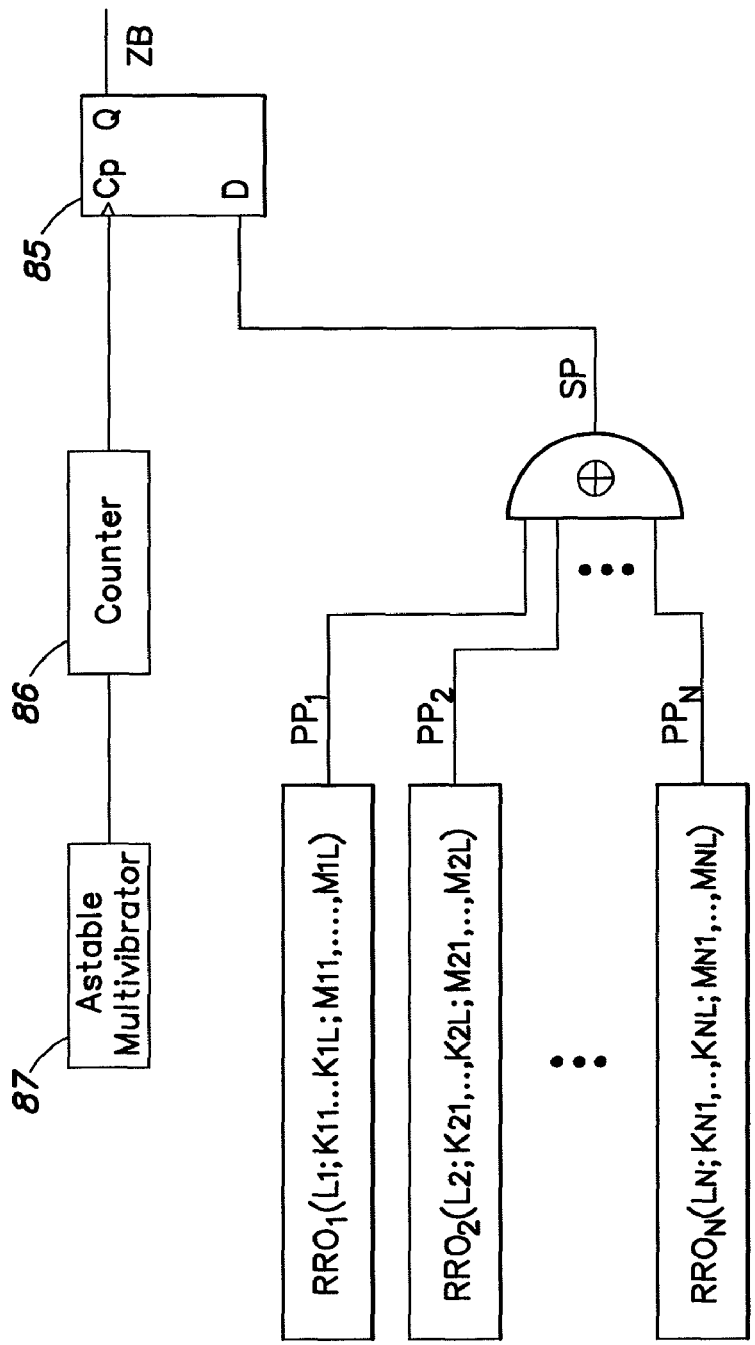
FIG. 11 depicts a random number generator having a number N of RROs and a sampled super parity signal.
Figure 12:
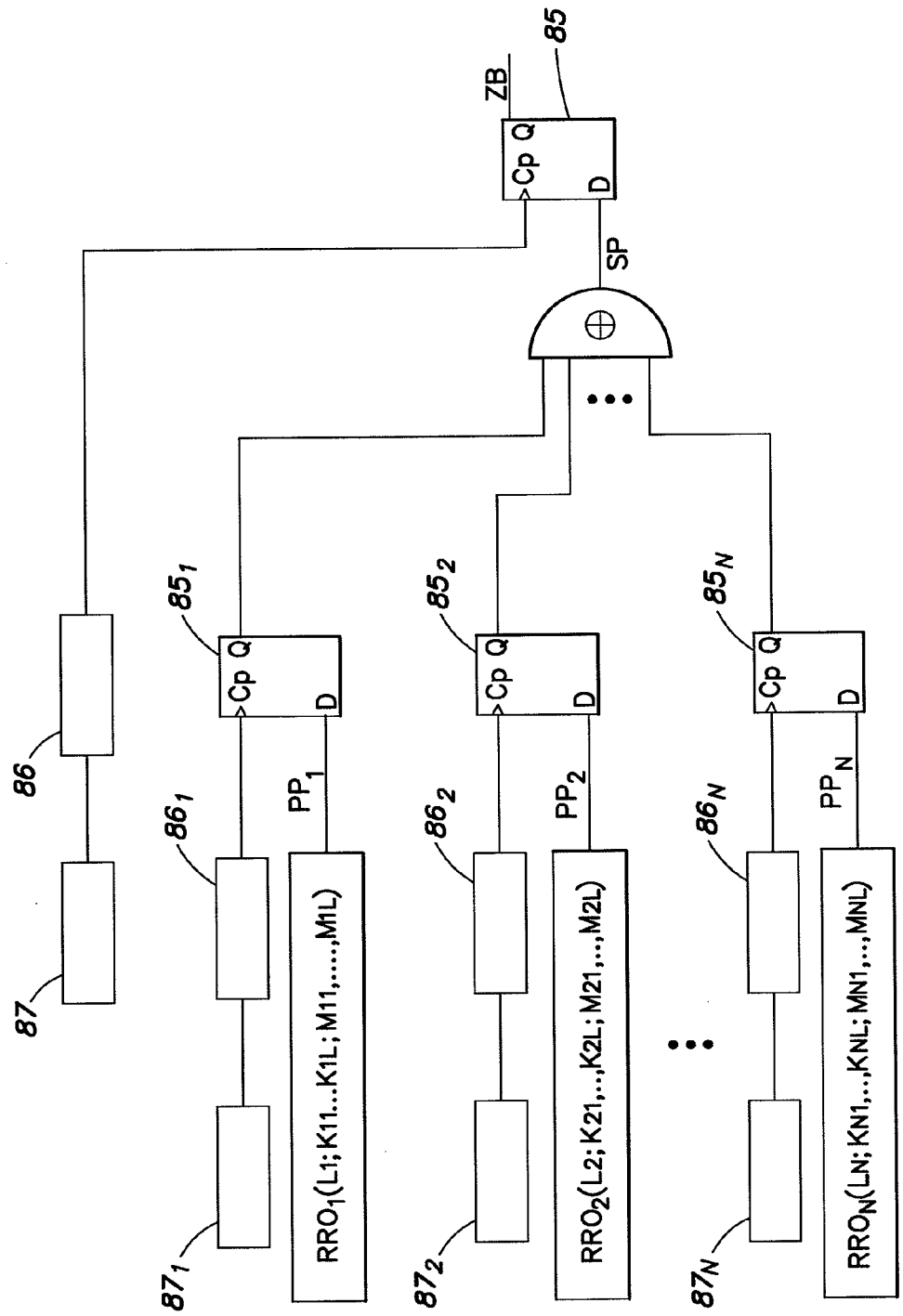
FIG. 12 depicts a random number generator having a number of N of sampled RROs and sampled super parity signal.
Figure 13:
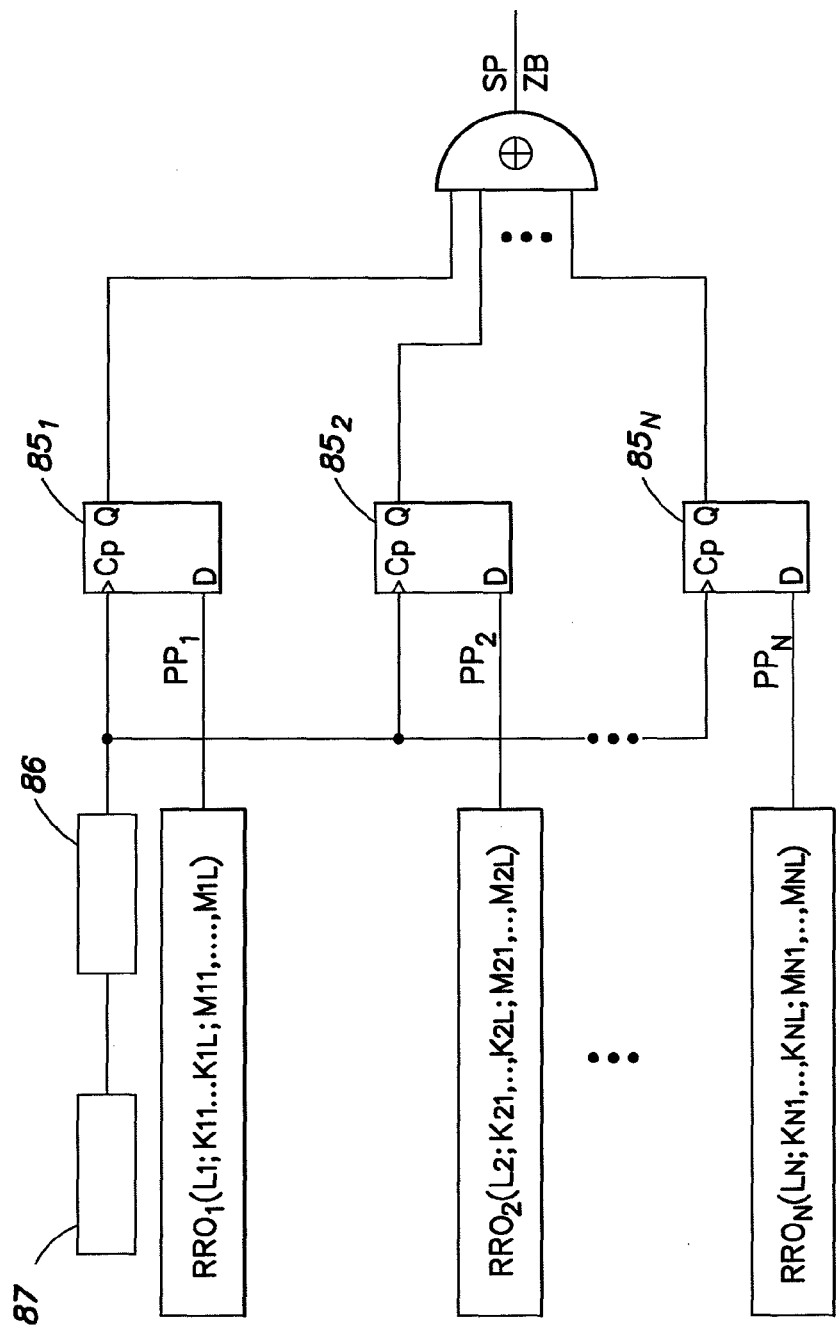
FIG. 13 depicts a random number generator having a number N of synchronized sampled RROs and a sampled super parity signal.
Figure 14:
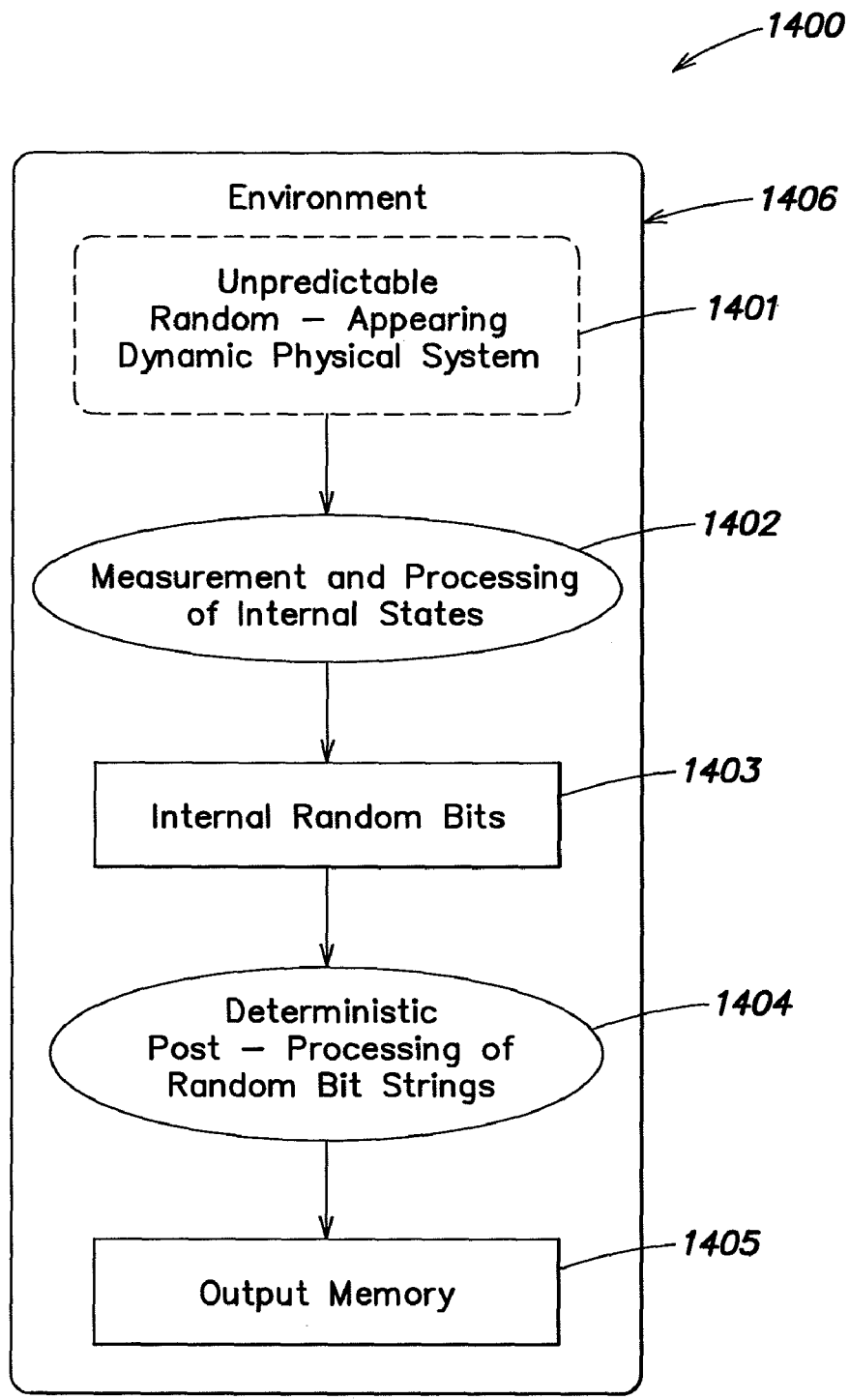
FIG. 14 depicts a model of a prior art physical random number generator.
Figure 15A:
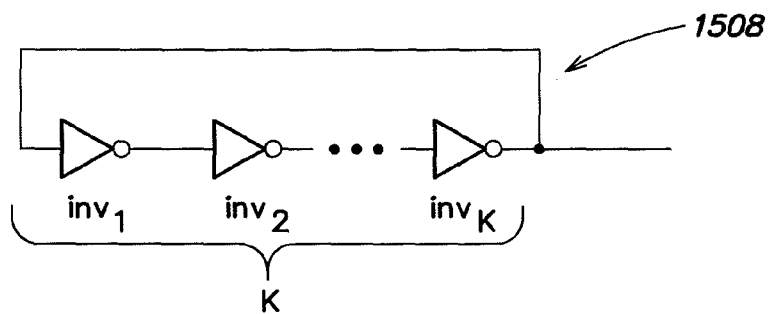
FIG. 15A illustrates an inverter-chain ring oscillator and FIG. 15B illustrates an inverter-chain ring oscillator with a control input.
Figure 15B:
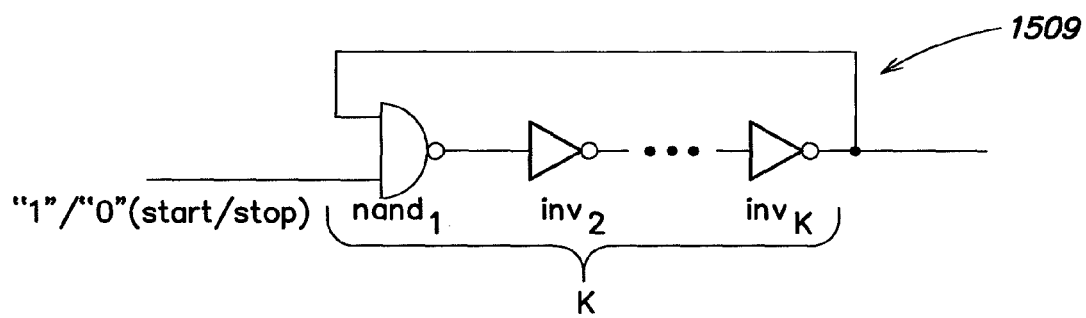
Figure 16A:
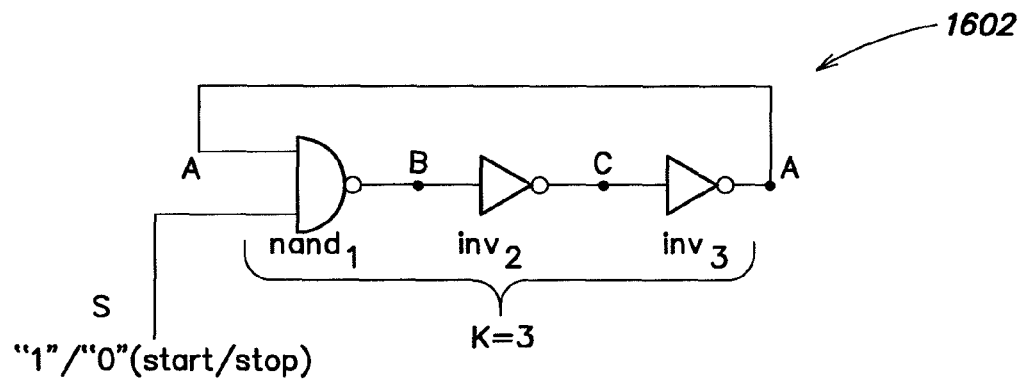
Figure 16B:
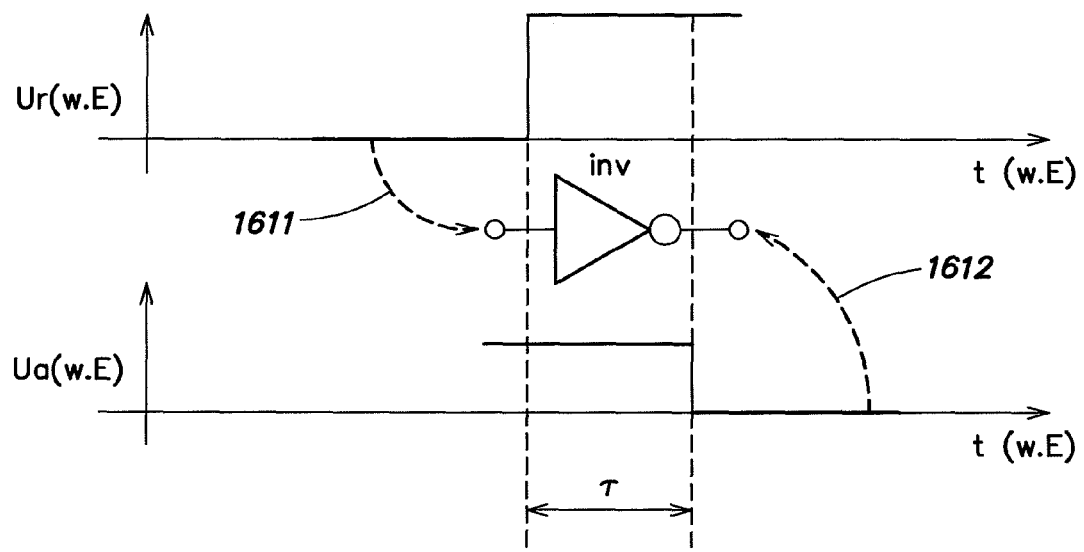
Figure 17A:
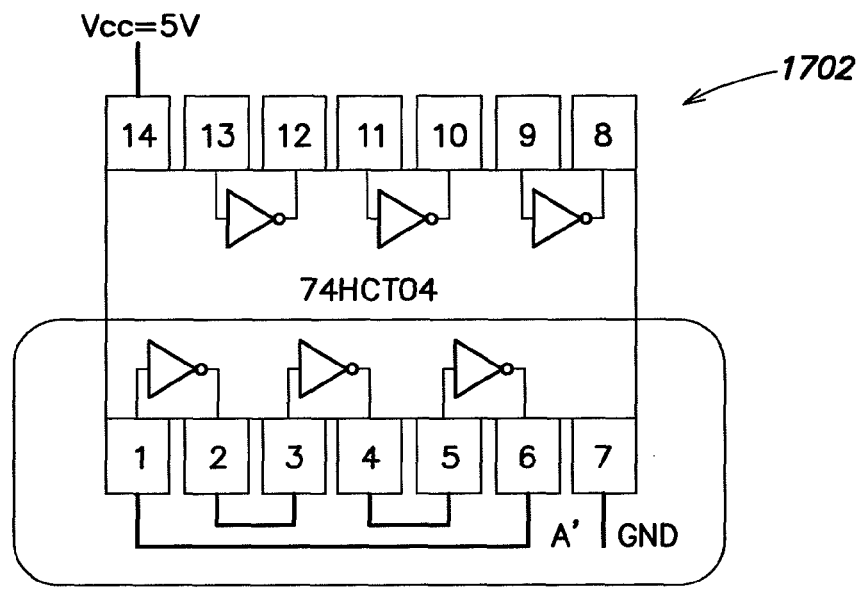
FIGS. 17A-17C depict an example of the practical implementation of the ring oscillator of FIGS. 16A-16C, including implementation of a ring oscillator for K=3 with the component 74HCT04; trace of its oscillation signal with thermal noise added; and envelope of the noisy oscillation signal.
Figure 17B:
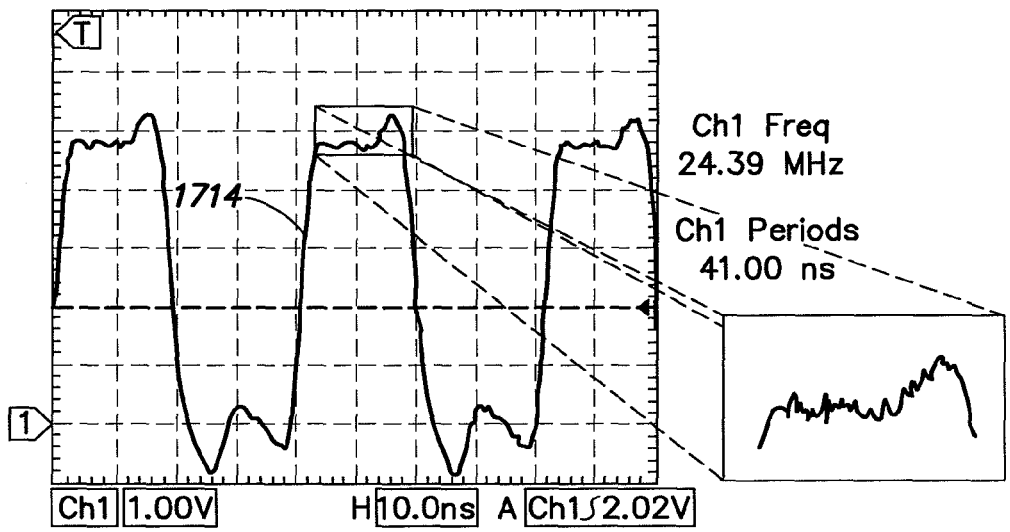
Figure 17C:
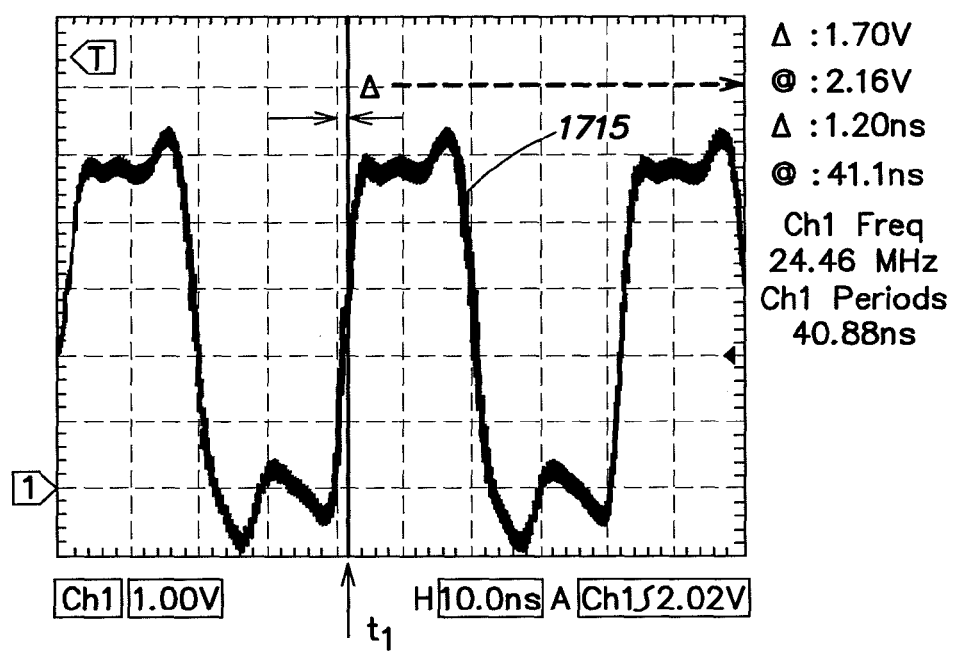
Figure 18:
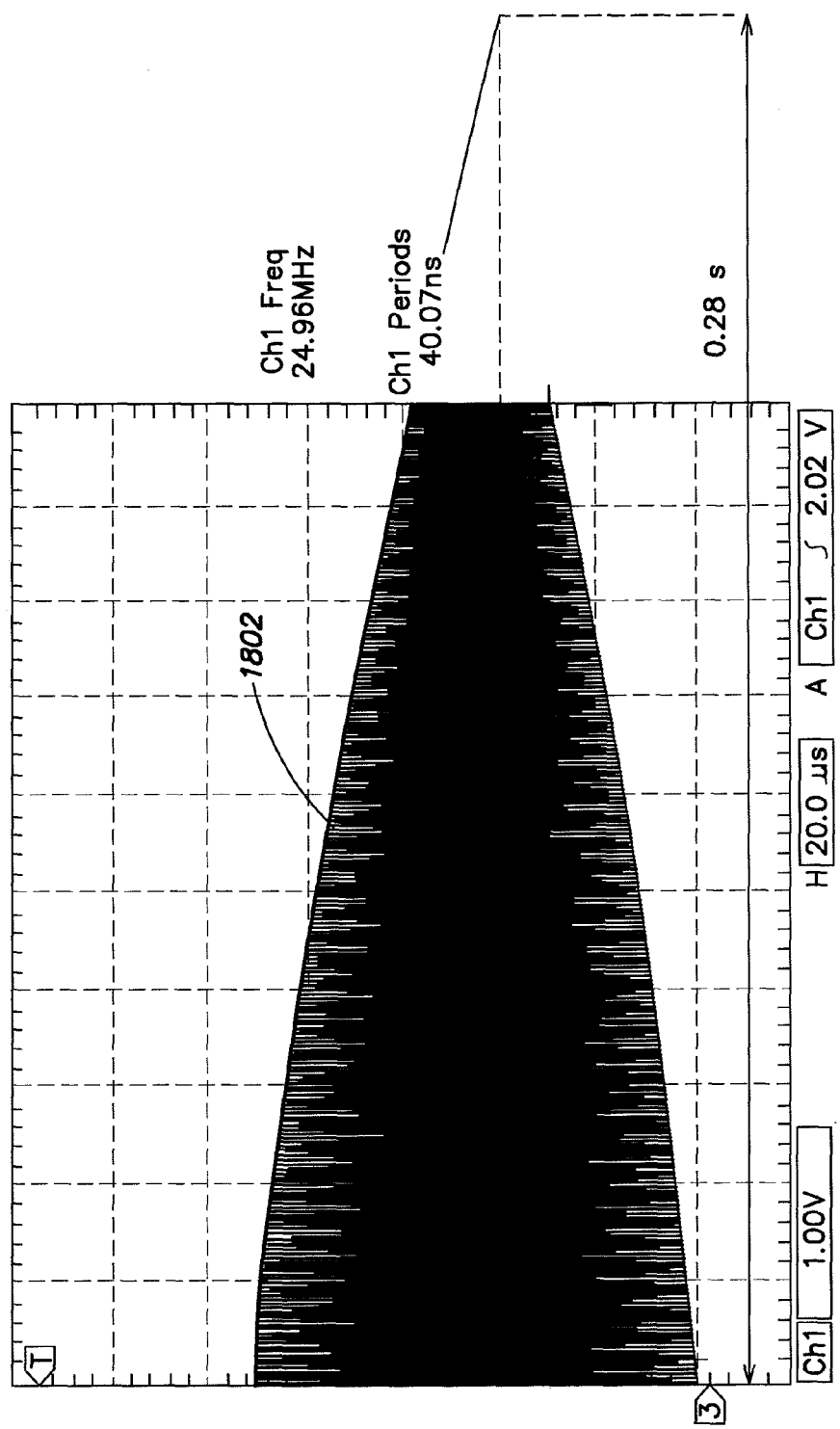
FIG. 18 depicts an averaged oscillation signal of the ring oscillator of FIG. 17A.
Figure 19A:
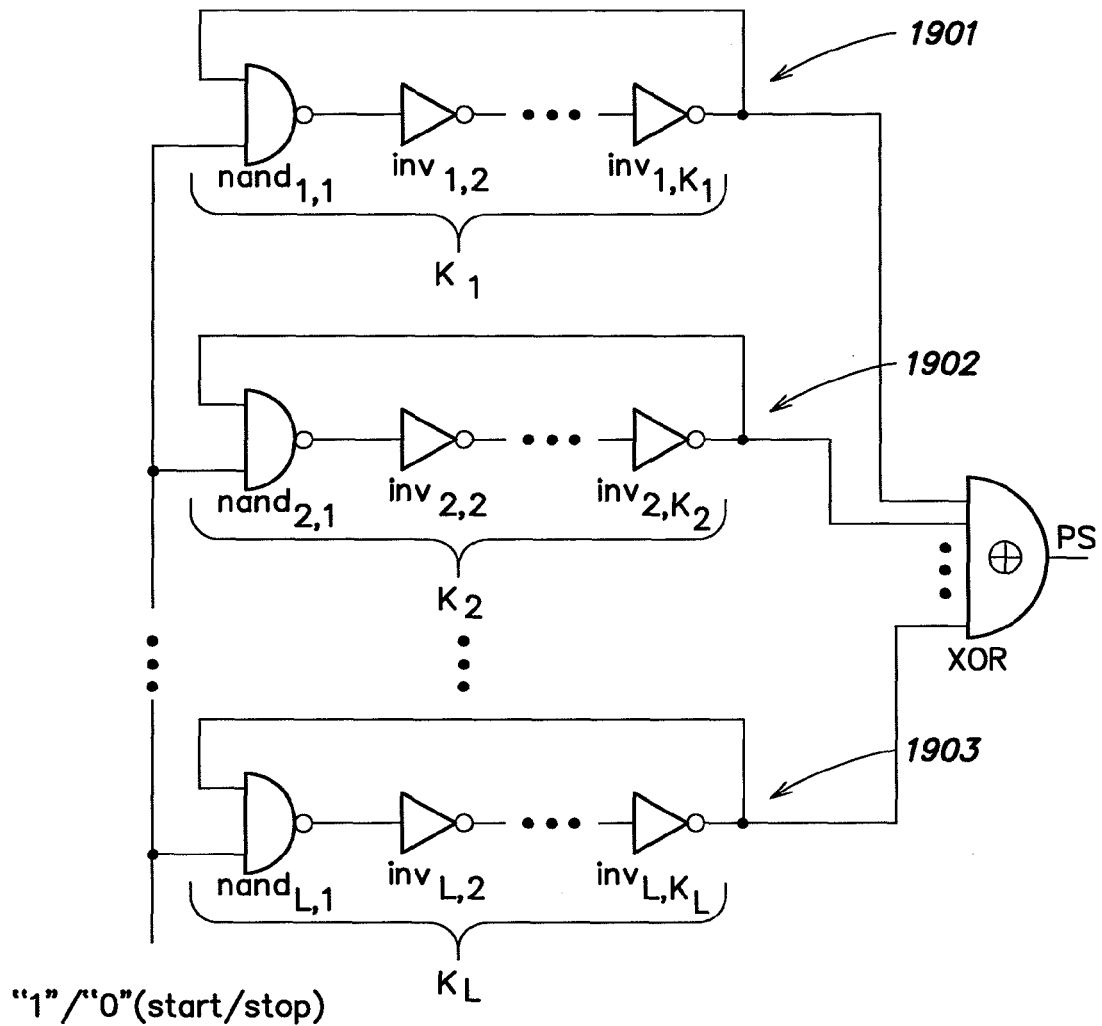
FIGS. 19A and 19B depict an example of the performance of a prior art parity check, including a circuit for parity checking of L ring oscillators with start/stop signal driven in common; and a circuit for parity checking of L ring oscillators with start/stop signal driven separately.
Figure 19B:
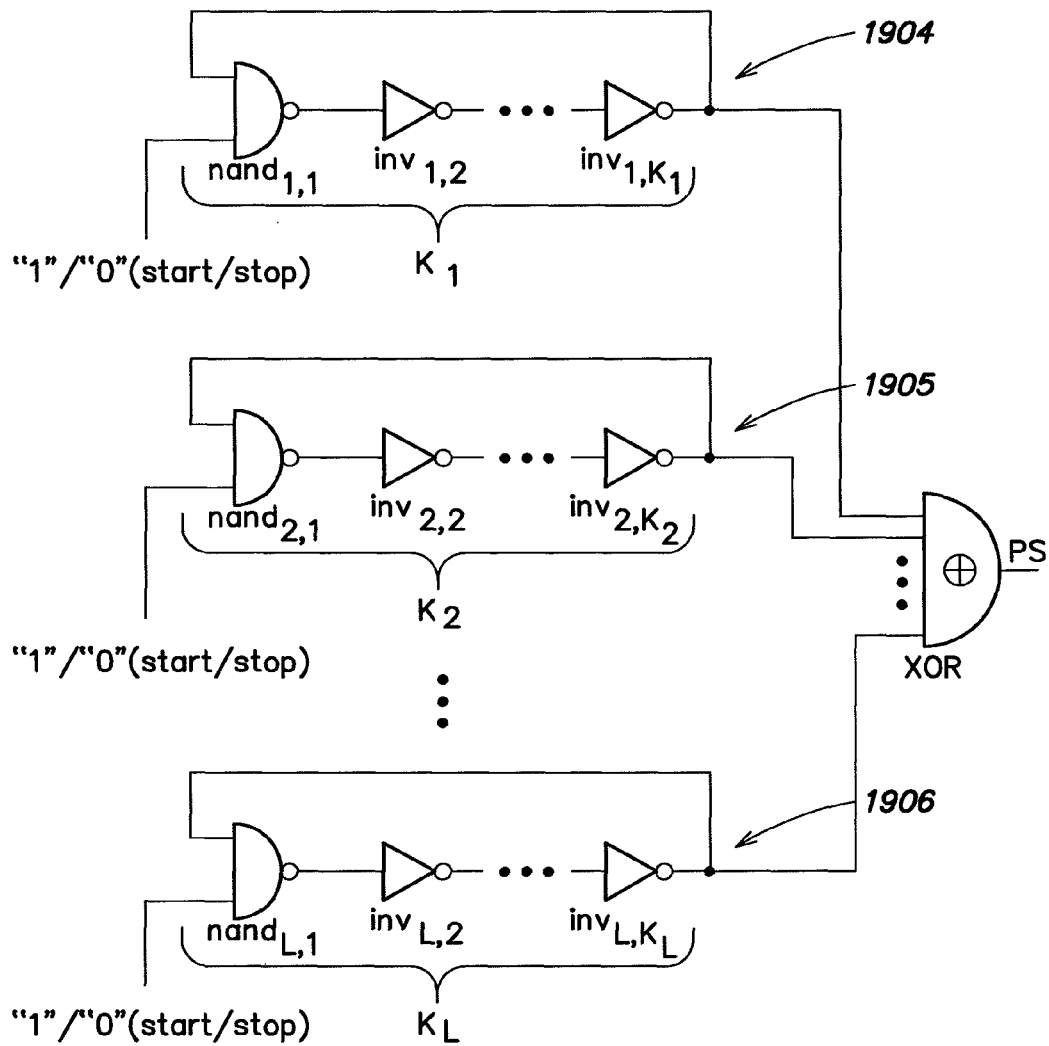
Figure 20A:
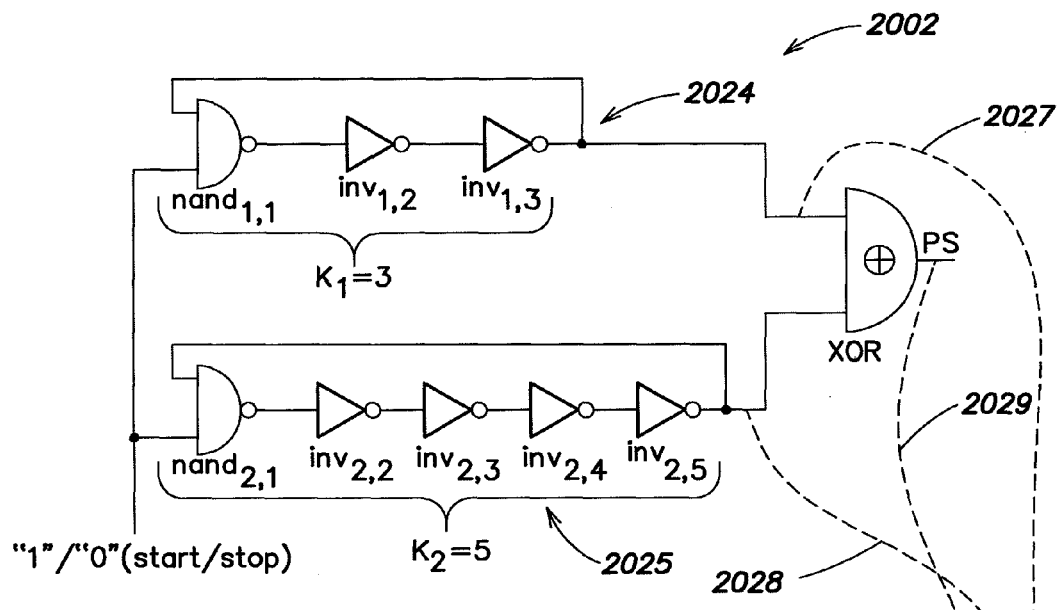
FIGS. 20A-20C depict an example of the practical performance of the parity check of FIG. 19A, including an example of a circuit for parity checking of two ring oscillators with start/stop signal driven in common; signals of the individual components and trace of the parity signal; and signals of the individual components and trace of the parity signal.
Figure 20B:
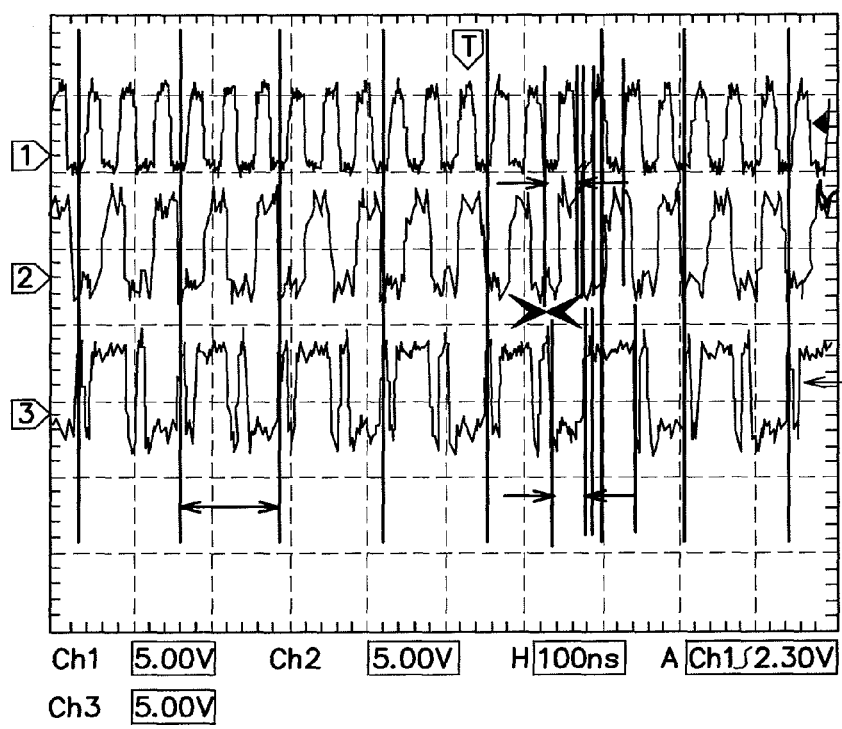
Figure 20C:
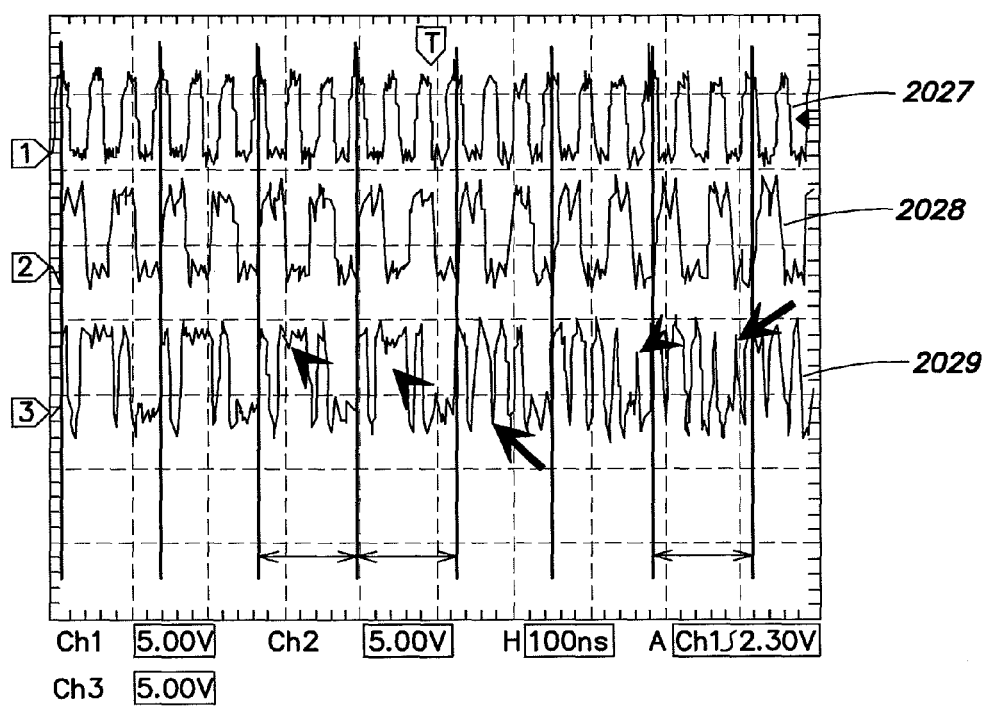

In order to eliminate these effects, a plurality of ring oscillators with feedback were coupled via a further (super) parity check SP. This coupling can be performed in a variety of ways. In FIG. 11, uniform sampling takes place after parity check PP; in FIG. 12, in contrast, the individual ring oscillators with feedback are sampled before (super) parity check SP. Because this takes place asynchronously, super parity signal SP must be sampled again in order to obtain random bits 7 of equal duration. In order to avoid this, sampling can also be performed synchronously, as shown in FIG. 13.

A small but still disturbing bias often manifests itself in practice. Accordingly, a random bit string is generated that is not good enough. Other electronically implemented TRNGs also have this defect, which is usually due to the unmatched operating points of the active semiconductor components used. In practice heretofore, a variety of deterministic postprocessings such as for example the frequently used von Neumann method have been performed after sampling (on the digital level) in order to neutralize this residual bias. All these algorithms substantially reduce the rate of generated random bits.

Figure 22:
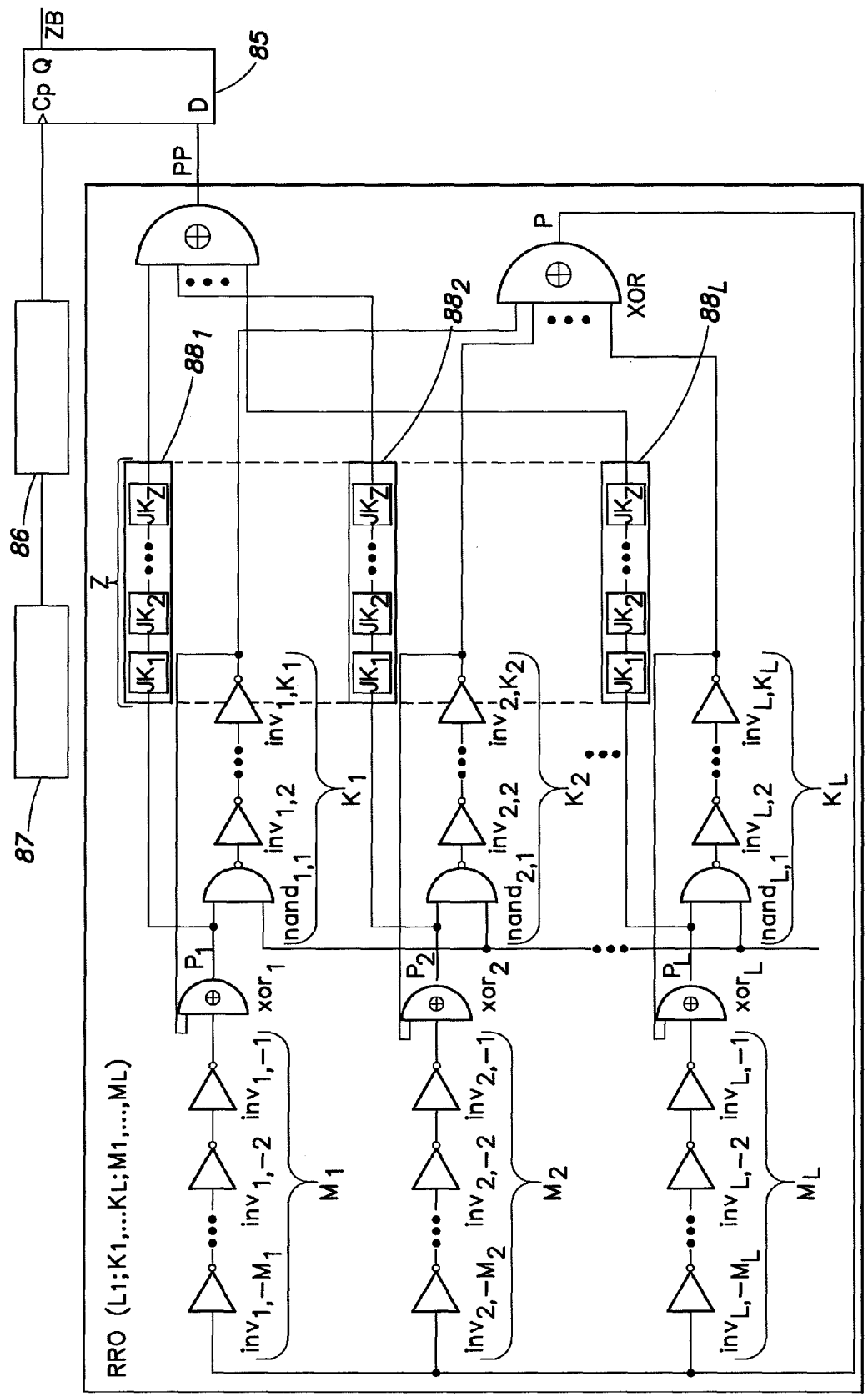
FIG. 22 depicts an RRO with neutralized residual bias.

Nevertheless, using ring oscillators with feedback (RRO), this residual bias can be neutralized even before sampling if binary counters $88_1$, $88_2$, . . . , $88_L$ of length Z (here with a number Z of JK-flipflops $JK_1$, $JK_2$, . . . , $JK_Z$) are connected to outputs $P_1$, $P_2$, . . . , $P_L$ of ring oscillators RRO (see FIG. 9). The outputs of these counters $88_1$, $88_2$, . . . , $88_L$ are connected to the inputs of the XOR gate, which delivers further parity signal PP (FIG. 22). By counting the signal transitions between two signal states (high and low with unequal duration), new (longer) signal states are obtained. In terms of duration, these new signal states are more similar to one another than the signal states of the original signal. The larger the number Z is, the better the signal state durations can be equalized and thus residual bias suppressed to arbitrarily small values. Good results are achieved even with Z=1.

Although the present invention has been illustrated and described with respect to several preferred embodiments thereof, various changes, omissions and additions to the form and detail thereof, may be made therein, without departing from the spirit and scope of the invention.

What is claimed is:

1. A method for generating random numbers, comprising: generating a plurality of oscillating digital output signals using at least two ring oscillators, and generating an external parity signal (PS) representing a logical state ("0," "1"), where the external parity signal takes on the logical state "1" when and only when an odd number of the plurality of digital output signals (A1, A2, . . . , AL) exhibit the logical state "1" and takes on the logical state "0" otherwise, wherein the external parity signal (PS) is fed back to an external parity input of the ring oscillators wherein the sum of the periodicity of an output signal ($A_1$, $A_2$, . . . , $A_L$) generated by a first of oscillators, which is equal in value to an odd multiple ($K_1$, $K_2$, $K_3$. . . , $K_L$) of a delay time of a gate, plus the delay time duration of the external parity signal (PS) at the external parity input of the first of the ring oscillators, equal in value to a multiple ($M_1$, $M_2$, $M_3$, . . . , $M_L$) of the delay time of a gate, equals an odd multiple of the delay time of a gate and wherein the sum of the periodicity of an output signal ($A_1$, $A_2$, . . . , $A_L$) generated by a second of the ring oscillators, which is equal in value to an odd multiple ($K_1$, $K_2$, $K_3$, . . . , $K_L$) of the delay time of gate, plus the delay time duration of the external parity signal (PS) at the external parity input of the second of the ring oscillators, equal in value to a multiple ($M_1$, $M_2$, $M_3$, . . . , $M_L$) of the delay time of a gate, equals an even multiple of the delay time of a gate.

2. The method of claim 1, wherein for each ring oscillator generating an internal parity signal ($P_1$, $P_2$, $P_3$, $P_4$, . . . , $P_L$) representing a predetermined logical state ("0," "1") when either the digital output signal of the respective ring oscillator or the signal fed back to the external parity input of the respective ring oscillator takes on a specified logical state.

3. The method of claim 2, further comprising generating a further parity signal (PP) representing a logical state ("0," "1"), which further parity signal takes on the logical state "1" when and only when an odd number of the internal parity signals ($P_1$, $P_2$, $P_3$, $P_4$, . . . , $P_L$) exhibit the logical state "1" and takes on the logical state "0" otherwise.

4. The method of claim 3, wherein signal transitions of the internal parity signals ($P_1$, $P_2$, $P_3$, $P_4$, . . . , $P_Z$) are counted before parity signal generation.

5. The method of claim 1, wherein at least one of the ring oscillators is excited into oscillation with the aid of a start signal ("1") supplied to a corresponding input (start/stop) of the corresponding ring oscillator.

6. The method of claim 5, wherein the ring oscillators are excited into oscillation, at the same time, with the aid of the same start signal ("1").

7. The method of claim 6, wherein the external parity signal (PS) is inverted before being fed back to at least one of the external parity inputs.

8. The method of claim 6, wherein the external parity signal (PS) is delayed before being fed back to at least one of the external parity inputs.

9. The method of claim 8, further comprising delaying the external parity signal (PS) by different time durations (τ) before being fed back to different external parity inputs.

10. A method for generating random numbers, comprising:
generating a plurality of oscillating digital output signals using at least two ring oscillators, wherein at least one of the ring oscillators is excited into oscillation with the aid of a start signal ("1") supplied to a corresponding input (start/stop) of the corresponding ring oscillator, and wherein the ring oscillators are excited into oscillation, at the same time, with the aid of the same start signal ("1");
generating an external parity signal (PS) representing a logical state ("0," "1"), where the external parity signal takes on the logical state "1" when and only when an odd number of the plurality of digital output signals (A1, A2, . . . , AL) exhibit the logical state "1" and takes on the logical state "0" otherwise, wherein the external parity signal (PS) is fed back to an external parity input of the ring oscillators, and wherein the external parity signal (PS) is delayed before being fed back to at least one of the external parity inputs; and
delaying the external parity signal (PS) by different time durations (τ) before being fed back to different external parity inputs;
wherein the periodicities of the ring oscillators and the delay time durations of the external parity signal (PS) at the external parity inputs of the ring oscillators are chosen such that the sum of the periodicity of the digital output signal generated by a first of the ring oscillators, which is equal in value to an odd multiple ($K_1$, $K_2$, $K_3$, ..., $K_L$) of a delay time of a gate, plus the delay time duration of the external parity signal (PS) at the external parity input of the first of the ring oscillators, equal in value to a multiple ($M_1$, $M_2$, $M_3$, ..., $M_L$) of the delay time of a gate, equals an odd multiple of the delay time of a gate and wherein the sum of the periodicity of an output signal ($A_1$, $A_2$, ..., $A_L$) generated by a second of the ring oscillators, which is equal in value to an odd multiple ($K_1$, $K_2$, $K_3$, ..., $K_L$) of the delay time of a gate, plus the delay time duration of the external parity signal (PS) at the external parity input of the second of the ring oscillators, equal in value to a multiple ($M_1$, $M_2$, $M_3$, ..., $M_L$) of the delay time of a gate, equals an even multiple of the delay time of a gate.

11. The method of claim 3, wherein the external parity signal (PS) is sampled at a specified rate (v) for generating random bits or wherein the further parity signal (PP) is sampled at a specified rate (v) for generating random bits.

12. The method of claim 1, wherein a plurality of external, in particular sampled, parity signals (PS) are generated and wherein there is generated a super parity signal (SP) representing a logical state ("0," "1"), where the super parity signal takes on the logical state "1" when and only when an odd number of the external, in particular sampled, parity signals (PS) exhibit the logical state "1" and takes on the logical state "0" otherwise, or wherein a plurality of further, in particular sampled, parity signals are generated and wherein there is generated a super parity signal (SP) representing a logical state ("0," "1"), which super parity signal takes on the logical state "1" when and only when an odd number of the further, in particular sampled, parity signals exhibit the logical state "1" and takes on the logical state "0" otherwise.

13. The method of claim 12, wherein the external or the further parity signals (PS) are synchronously sampled at a specified rate (v) for generating random bits (ZB) or wherein the super parity signal (SP) is sampled at a specified rate (v) for generating random bits (ZB).

14. The method of claim 11, wherein sampling is performed at random, nonuniform sampling intervals, in particular wherein the sampling is performed when one of the random bits (ZB) generated a predetermined logical state ("1").

15. A random number generator, comprising: at least two ring oscillators, that comprise independently free-running inverter chains with feedback having an odd number (K) of series-connected inverters ($inv_{1,2}$, $inv_{2,1}$, $inv_{3,1}$, ..., $inv_{i,j}$, ..., $inv_{L,KL}$), which generate oscillating digital output signals ($A_1$, $A_2$, ..., $A_L$) unequal in periodicity, and having first parity signal generating means (XOR) for generating an external parity signal (PS) representing a predetermined logical state ("0," "1"), which external parity signal takes on the logical state "1" when and only when an odd number of the output signals ($A_1$, $A_2$, ..., $A_L$) exhibit the logical state "1" and takes on the logical state "0" otherwise, wherein there are feedback means ($xor_1$, $xor_2$, $xor_3$, $xor_4$, ..., $xor_L$) for feeding back the external parity signal (PS) to an external parity input of each of the respective ring oscillators wherein the sum of the periodicity of an output signal ($A_1$, $A_2$, ..., $A_L$) generated by a first of the ring oscillators, which is equal in value to an odd multiple $K_1$, $K_2$, $K_3$, ..., $K_L$) of a delay time of a gate, plus the delay time duration of the external parity signal (PS) at the external parity input of the first of the ring oscillators, equal in value to a multiple ($M_1$, $M_2$, $M_3$, ..., $M_L$) of the delay time of a gate, equals an odd multiple of the delay time of a gate and wherein the sum of the periodicity of an output signal ($A_1$, $A_2$, ..., $A_L$) generated by a second oscillators, which is equal in value to an odd multiple $K_1$, $K_2$, $K_3$, ..., $K_L$) of the delay time of a gate, plus the delay time duration of the external parity signal (PS) at the external parity input of the second of the ring oscillators, equal in value to a multiple ($M_1$, $M_2$, $M_3$, ..., $M_L$) of the delay time of a gate, equals an even multiple of the delay time of a gate.

16. The random number generator of claim 15, wherein the first parity signal generating means comprises an XOR gate (XOR) that receives the output signals ($A_1$, $A_2$, ..., $A_L$).

17. The random number generator of claim 15, further comprising second parity signal generating means ($xor_1$, $xor_2$, $xor_3$, ..., $xor_L$) for generating, for each ring oscillator, an internal parity signal ($P_1$, $P_2$, $P_3$, $P_4$, ..., $P_L$) representing a specified logical state ("1"), which internal parity signal takes on the logical state "1" when and only when either the output signal of the respective ring oscillator or the signal fed back to the external parity input of the respective ring oscillator takes on a specified logical state ("1").

18. The random number generator of claim 17, wherein the second parity signal generating means comprise XOR gates ($xor_1$, $xor_2$, $xor_3$, ..., $xor_L$) each having an external parity input and an output signal input, a signal derived from the external parity signal (PS) being present at the parity input and the respective output signal ($A_1$, $A_2$, ..., $A_L$) of the respective ring oscillator being present at the output signal input.

19. The random number generator of claim 18, further comprising third parity signal generating means for generating a further parity signal (WP) representing a logical state ("0," "1"), which further parity signal takes on the logical state "1" when and only when an odd number of the internal parity signals ($P_1$, $P_2$, $P_3$, $P_4$, ..., $P_L$) exhibit the logical state "1" and takes on the logical state "0" otherwise.

20. The random number generator of claim 19, further comprising counting means for counting transitions of the internal parity signals ($P_1$, $P_2$, $P_3$, $P_4$, ..., $P_L$) before parity signal generation.

21. The random number generator of claim 20, wherein the counting means comprises a binary counter that includes a chain with flipflops.

22. The random number generator of claim 15, further comprising starting means for generating a start signal ("1") and supplying it to an input (start/stop) of at least one of the ring oscillators so that this ring oscillator is excited into oscillation.

23. The random number generator of claim 22, wherein the at least one of the ring oscillators comprises, a NAND gate ($nand_1$, $nand_{1,1,2,1}$, $nand_{3,1}$, ..., $nand_{L,1}$)having the input (start/stop) for the supplying of the start signal ("1").

24. The random number generator of claim 22, wherein the starting means are fashioned such that the ring oscillators are excited into oscillation, at the same time, with the aid of the same start signal ("1").

25. The random number generator of claim 24, wherein all ring oscillators comprise an associated NAND gate each having an input (start/stop), which are connected to one another for the supplying of the start signal ("1").

26. The random number generator of claim 15, wherein connected in front of the at least one external parity input is an inverter to which the external parity signal (PS) is supplied.

27. The random number generator of claim 26, wherein connected in front of all external parity inputs are inverter chains having unequal numbers ($M_1$, $M_2$, ..., $_{M1}$) of inverters, to which the external parity signal (PS) is supplied.

28. A random number generator, comprising: at least two ring oscillators, that comprise independently free-running inverter chains with feedback having an odd number (K) of series-connected inverters ($inv_{1,2}$, $inv_{2,1}$, $inv_{3,1}$, ..., $inv_{i,j}$, ..., $inv_{L,KL}$), which generate oscillating digital output signals ($A_1, A_2, ..., A_L$) unequal in periodicity, and having first parity signal generating means (XOR) for generating an external parity signal (PS) representing a predetermined logical state ("0," "1"), which external parity signal takes on the logical state "1" when and only when an odd number of the output signals ($A_1, A_2, ..., A_L$) exhibit the logical state "1" and takes on the logical state "0" otherwise, wherein there are feedback means ($xor_1, xor_2, xor_3, xor_4, ..., xor_L$) for feeding back the external parity signal (PS) to an external parity input of each of the respective ring oscillators;

wherein connected in front of the at least one external parity input is an inverter to which the external parity signal (PS) is supplied;

wherein connected in front of all external parity inputs are inverter chains having unequal numbers ($M_1, M_2, ..., M_L$) of inverters, to which the external parity signal (PS) is supplied; and wherein the sum of the periodicity of an output signal ($A_1, A_2, ..., A_L$) generated by a first of the ring oscillators, which is equal in value to an odd multiple ($K_1, K_2, K_3, ..., K_L$) of a delay time of a gate, plus the delay time duration of the external parity signal (PS) at the external parity input of the first of the ring oscillators, equal in value to a multiple ($M_1, M_2, M_3, ..., M_L$) of the delay time of a gate, equals an odd multiple of the delay time of a gate and wherein the sum of the periodicity of an output signal ($A_1, A_2, ..., A_L$) generated by a second of the ring oscillators, which is equal in value to an odd multiple ($K_1, K_2, K_3, ..., K_L$) of the delay time of a gate, plus the delay time duration of the external parity signal (PS) at the external parity input of the second of the ring oscillators, equal in value to a multiple ($M_1, M_2, M_3, ... M_L$) of the delay time of a gate, equals an even multiple of the delay time of a gate.

29. The random number generator of claim 19, further comprising sampling means for sampling the external parity signal (PS) at a specified rate (v) for generating random bits (ZB) or wherein there are sampling means that sample the further parity signal (PP) at a specified rate (v) for generating random bits (ZB).

30. The random number generator of claims 15, wherein there are a plurality of random number generators that generate external, in particular sampled, parity signals (PS) and wherein there are super parity signal generating means for generating a super parity signal (SP) representing a logical state ("0," "1"), which super parity signal takes on the logical state "1" when and only when an odd number of the external, in particular sampled, parity signals (PS) exhibit the logical state "1" and takes on the logical state "0" otherwise, or wherein there are a plurality of random number generators that generate further, in particular sampled, parity signals (PP), and wherein there are super parity signal generating means for generating the super parity signal (SP) representing a logical state ("0," "1"), which super parity signal takes on the logical state "1" when and only when an odd number of the further, in particular sampled, parity signals (PP) exhibit the logical state "1" and takes on the logical state "0" otherwise.

31. The random number generator of claim 30, wherein there are sampling means for sampling the external parity signals (PS) or the further parity signals (PP) synchronously at a specified rate (v) for generating random bits (ZB) or wherein there are sampling means that sample the super parity signal (SP) at a specified rate (v) for generating random bits (ZB).

32. The random number generator of claim 31, wherein the sampling means are designed to perform sampling at random, non-uniform sampling intervals and in particular to perform sampling when a random bit (ZB) randomly generated the random generator takes on a predetermined logical state ("1").

33. The random number generator of claim 32, wherein the sampling means comprises a D-flip-flop driven by a pulse from a clock ($C_p$), in particular from an astable multivibrator or by a ring oscillator with feedback (RRO).

34. The method of claim 1, wherein the generated oscillating digital output signals have equal periodicity.

35. The method of claim 1, wherein the generated oscillating digital output signals have unequal periodicity.

* * * * *